(12) United States Patent
Jiao et al.

(10) Patent No.: US 11,966,428 B2
(45) Date of Patent: Apr. 23, 2024

(54) RESOURCE-EFFICIENT SEQUENCE GENERATION WITH DUAL-LEVEL CONTRASTIVE LEARNING

(71) Applicant: Microsoft Technology Licensing, LLC, Redmond, WA (US)

(72) Inventors: Jian Jiao, Bellevue, WA (US); Yeyun Gong, Beijing (CN); Nan Duan, Beijing (CN); Ruofei Zhang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 411 days.

(21) Appl. No.: 17/364,919

(22) Filed: Jul. 1, 2021

(65) Prior Publication Data
US 2023/0004588 A1 Jan. 5, 2023

(51) Int. Cl.
*G06F 16/33* (2019.01)
*G06F 40/284* (2020.01)
(Continued)

(52) U.S. Cl.
CPC ........ *G06F 16/3334* (2019.01); *G06F 40/284* (2020.01); *G06N 3/045* (2023.01);
(Continued)

(58) Field of Classification Search
CPC .... G06F 16/3334; G06F 16/33; G06F 16/345; G06F 16/24578; G06F 16/3329; G06F 40/284; G06F 40/30; G06F 40/58; G06F 40/295; G06F 40/216; G06F 40/242; G06F 40/169; G06F 18/214; G06F 8/33; G10L 15/063; G10L 15/16; G06N 3/045; G06N 3/08; G06N 3/084; G06N 3/04;
(Continued)

(56) References Cited

U.S. PATENT DOCUMENTS 10,431,210 B1 * 10/2019 Huang .................... G06N 3/084
2019/0130221 A1 * 5/2019 Bose ....................... G06N 3/045
(Continued)

OTHER PUBLICATIONS

Zhuoan Ma, "Contrastive Visual Representation Learning Enhanced with Knowledge Embedding for Reinforcement Learning", 2021 2nd International Conference on Electronics, Communications and Information Technology CECIT, p. 407-412 (Year: 2021).*
(Continued)

*Primary Examiner* — Leshui Zhang

(57) ABSTRACT

A training system produces a resource-efficient machine-trained model via a training architecture that employs plural processing paths. Some of the processing paths incorporate the use of auxiliary information that imparts external knowledge about source items being processed. The training architecture also employs contrastive learning that operates at different respective levels within the training architecture. For instance, the training architecture uses encoder-level contrastive learning to compare output information generated by different encoders within the training architecture. The training architecture uses decoder-level contrastive learning to compare output information produced by different decoders within the training architecture. An inference-stage system performs an application task using the model produced by the training system.

19 Claims, 11 Drawing Sheets

(51) Int. Cl.
G06N 3/045 (2023.01)
G06N 3/08 (2023.01)
G06N 5/025 (2023.01)
G06N 5/04 (2023.01)

(52) U.S. Cl.
CPC ............... G06N 3/08 (2013.01); G06N 5/025 (2013.01); G06N 5/04 (2013.01)

(58) Field of Classification Search
CPC ........ G06N 3/044; G06N 3/082; G06N 5/025; G06N 5/04; G06N 20/00
USPC .... 704/1–9, 231, 232, 238, 239; 706/10, 12, 706/13, 14, 15, 16, 25, 41, 42, 45, 46, 50, 706/51, 55, 61, 62
See application file for complete search history.

(56) References Cited

U.S. PATENT DOCUMENTS

| | | | |
|---|---|---|---|
| 2021/0406669 A1* | 12/2021 | Yu | G06N 3/044 |
| 2022/0067590 A1* | 3/2022 | Georgopoulos | G06F 40/279 |
| 2022/0100800 A1* | 3/2022 | Georgopoulos | G06N 20/00 |
| 2022/0108183 A1* | 4/2022 | Arpit | G06N 3/045 |

OTHER PUBLICATIONS

Li et al, "KFCNet: Knowledge Filtering and Contrastive Learning Network for Generative Commonsense Reasoning", the Association for Computational Linguistics: EMNLP 2021, pp. 2918-2928, Nov. 7-11 (Year: 2021).*

Hiroki et al "Machine Translation Evaluation with BERT Regressor", arxiv logo>cs> arXiv:1907.12679v1, Jul. 29, pp. 1-6 (Year: 2019).*

Bachman, et al., "Learning Representations by Maximizing Mutual Information Across Views," in Advances in Neural Information Processing Systems, Dec. 2019, 11 pages.

Cao, et al., "Retrieve, Rerank and Rewrite: Soft Template Based Neural Summarization," in Proceedings of the 56th Annual Meeting of the Association for Computational Linguistics, ACL, 2018, pp. 152-161.

Edelman, et al., "Internet Advertising and the Generalized Second-Price Auction: Selling Billions of Dollars Worth of Keywords," American Economic Review, 2007, 97(1), pp. 242-259.

Gao, et al., "SimCSE: Simple Contrastive Learning of Sentence Embeddings," in Proceedings of the 2021 Conference on Empirical Methods in Natural Language Processing, ACL, Nov. 2021, pp. 6894-6910.

Guan, et al., "Story Ending Generation with Incremental Encoding and Commonsense Knowledge," in The Thirty-Third AAAI Conference on Artificial Intelligence, 2019, pp. 6473-6480.

He, et al., "DeBERTa: Decoding-enhanced BERT with Disentangled Attention," in arXiv e-prints, arXiv:2006.03654v6 [cs.CL], Oct. 6, 2021. CoRR, 23 pages.

Hénaff, et al., "Data-Efficient Image Recognition with Contrastive Predictive Coding," in arXiv e-prints, arXiv:1905.09272v3 [cs.CV], Jul. 1, 2020, 13 pages.

Hossain, et al., "Simple and Effective Retrieve-Edit-Rerank Text Generation," in Proceedings of the 58th Annual Meeting of the Association for Computational Linguistics, ACL, Jul. 2020, pp. 2532-2538.

Liu, et al., "RoBERTa: A Robustly Optimized BERT Pretraining Approach," arXiv e-prints, arXiv:1907.11692v1 [cs.CL], Jul. 26, 2019, 13 pages.

Qi, et al., "ProphetNet: Predicting Future N-gram for Sequence-to-Sequence Pre-training," in Findings of the Association for Computational Linguistics: EMNLP 2020, Nov. 2020, pp. 2401-2410.

Russakovsky, et al., "ImageNet Large Scale Visual Recognition Challenge," in arXiv e-prints, arXiv:1409.0575v3 [cs.CV], Jan. 30, 2015, 43 pages.

Sakaguchi, et al., "WinoGrande: An Adversarial Winograd Schema Challenge at Scale," in Communications of the ACM, vol. 24, No. 9, Sep. 2021, pp. 99-106.

Sun, et al., "ERNIE: Enhanced Representation Through Knowledge Integration," in Proceedings of the 57th Annual Meeting of the Association for Computational Linguistics, 2019, pp. 1441-1451.

Talmor, et al., "Commonsenseqa: A Question Answering Challenge Targeting Commonsense Knowledge," in Proceedings of the 2019 Conference of the North American Chapter of the Association for Computational Linguistics: Human Language Technologies, NAACL-HLT, 2019, pp. 4149-4158.

Thorne, et al., "FEVER: a large-scale dataset for Fact Extraction and VERification," in Proceedings of the 2018 Conference of the North American Chapter of the Association for Computational Linguistics: Human Language Technologies, NAACL-HLT, 2018, pp. 809-819.

Tian, et al., "Contrastive Multiview Coding," in arXiv e-prints, arXiv:1906.05849v5 [cs.CV], Dec. 18, 2020, 16 pages.

Wei, et al., "On Learning Universal Representations Across Languages," in arXiv e-prints, arXiv:2007.15960v4 [cs.CL], Mar. 22, 2021, 18 pages.

Weston, et al., "Retrieve and Refine: Improved Sequence Generation Models for Dialogue," in Proceedings of the 2018 EMNLP Workshop SCAI: The 2nd Int'l Workshop on Search-Oriented Conversational AI, pp. 87-92.

Wu, et al., "Unsupervised Feature Learning via Non-Parametric Instance Discrimination," open access version of paper in 2018 IEEE/CVF Conference on Computer Vision and Pattern Recognition, CVPR, 2018, 10 pages.

Yang, et al., "XLNet: Generalized Autoregressive Pretraining for Language Understanding," in Advances in Neural Information Processing Systems, NeurIPS, 2019, 11 pages.

Zellers, et al., "SWAG: A Large-Scale Adversarial Dataset for Grounded Commonsense Inference," in Proceedings of the 2018 Conference on Empirical Methods in Natural Language Processing, EMNLP, 2018, pp. 93-104.

Li, et al., "KFCNet: Knowledge Filtering and Contrastive Learning Network for Generative Commonsense Reasoning," in Findings of the Association for Computational Linguistics: EMNLP 2021, Nov. 2021, pp. 2918-2928.

Li, et al., "KFCNet: Knowledge Filtering and Contrastive Learning Network for Generative Commonsense Reasoning," in arXiv e-prints, arXiv:2109.06704v1 [cs.CL], Sep. 14, 2021, 11 pages.

Anderson, et al., "SPICE: Semantic Propositional Image Caption Evaluation," arXiv:1607.08822v1 [cs.CV], Jul. 19, 2016, 17 pages.

Banerjee, et al., "METEOR: An Automatic Metric for MT Evaluation with Improved Correlation with Human Judgments," in Proceedings of the ACL Workshop on Intrinsic and Extrinsic Evaluation Measures for Machine Translation and/or Summarization, Jun. 2005, pp. 65-72.

Bao, et al., "UniLMv2: Pseudo-Masked Language Models for Unified Language Model Pre-Training," arXiv:2002.12804v1 [cs.CL], Feb. 28, 2020, 11 pages.

Bowman, et al., "A large annotated corpus for learning natural language inference," in Proceedings of the 2015 Conference on Empirical Methods in Natural Language Processing, Sep. 2015, pp. 632-642.

Chen, et al., "A Simple Framework for Contrastive Learning of Visual Representations," in Proceedings of the 37th International Conference on Machine Learning, vol. 119, Jul. 2020, 11 pages.

Chi, et al., "InfoXLM: An Information-Theoretic Framework for Cross-Lingual Language Model Pre-Training," arXiv:2007.07834v2 [cs.CL], Apr. 7, 2021, 13 pages.

Dong et al., "Unified Language Model Pre-training for Natural Language Understanding and Generation," in Advances in Neural Information Processing Systems 32, Dec. 2018, 13 pages.

Fan, et al., "An Enhanced Knowledge Injection Model for Commonsense Generation," in Proceedings of the 28th International Conference on Computational Linguistics, COLING 2020, Dec. 2020, 12 pages.

Fang, et al., "CERT: Contrastive Self-supervised Learning for Language Understanding," arXiv:2005.12766v2 [cs.CL], Jun. 18, 2020, 16 pages.

(56) References Cited

OTHER PUBLICATIONS

Grill, et al., "Bootstrap Your Own Latent—A New Approach to Self-Supervised Learning," in Part of Advances in Neural Information Processing Systems 33, Dec. 2020, 14 pages.

Gunel, et al., "Supervised Contrastive Learning for Pre-trained Language Model Fine-tuning," arXiv:2011.01403v3 [cs.CL], Apr. 2, 2021 15 pages.

He, et al., "Momentum Contrast for Unsupervised Visual Eepresentation Learning," CVF Open Access version of paper in 2020 IEEE/CVF Conference on Computer Vision and Pattern Recognition, CVPR 2020, Jun. 2020, pp. 9726-9738.

Karpukhin, et al., "Dense Passage Retrieval for Open-Domain Question Answering," in Proceedings of the 2020 Conference on Empirical Methods in Natural Language Processing, EMNLP 2020, Nov. 2020, pp. 6769-6781.

Khosla, et al., "Supervised contrastive learning," in Advances in Neural Information Processing Systems 33: Annual Conference on Neural Information Processing Systems 2020, Dec. 2020, 13 pages.

Krishna, et al., "Dense-Captioning Events in Videos," CFV Open Access version of paper in IEEE International Conference on Computer Vision, ICCV 2017, Oct. 2017, pp. 706-715.

Lewis, et al., "BART: Denoising Sequence-to-Sequence Pre-training for Natural Language Generation, Translation, and Comprehension," in Proceedings of the 58th Annual Meeting of the Association for Computational Linguistics, ACL 2020, Online, Jul. 2020, pp. 7871-7880.

Lewis, et al., "Retrieval-Augmented Generation for Knowledge-Intensive NLP Tasks," in Advances in Neural Information Processing Systems 33: Annual Conference on Neural Information Processing Systems 2020, Dec. 2020, 16 pages.

Lin, et al., "CommonGen: A Constrained Text Generation Challenge for Generative Commonsense Reasoning," arXiv:1911.03705v4 [cs.CL], Nov. 20, 2020, 18 pages.

Lin, Chin-Yew, "ROUGE: A Package for Automatic Evaluation of Summaries," in Text Summarization Branches Out, Association for Computational Linguistics, Jul. 2004, 8 pages.

Liu, et al., "KG-BART: Knowledge Graph-Augmented BART for Generative Commonsense Reasoning," arXiv:2009.12677v2 [cs.CL], Jan. 21, 2021, 10 pages.

Meng, et al., "COCO-LM: Correcting and Contrasting Text Sequences for Language Model Pretraining," arXiv:2102.08473v1 [cs.CL], Feb. 16, 2021, 13 pages.

Papineni, et al., "BLEU: a Method for Automatic Evaluation of Machine Translation," in Proceedings of the 40th Annual Meeting of the Association for Computational Linguistics, Jul. 2002, 8 pages.

Radford, et al., "Language Models are Unsupervised Multitask Learners," available at https://cdn.openai.com/better-language-models/language_models_are_unsupervised_multitask_learners.pdf, in OpenAI blog, 1(8):9, 24 pages.

Raffel, et al., "Exploring the Limits of Transfer Learning with a Unified Text-to-Text Transformer," in Journal of Machine Learning Research, 21, Jun. 2020, 67 pages.

Sharma, et al., "Conceptual Captions: A Cleaned, Hypernymed, Image Alt-text Dataset for Automatic Image Captioning," in Proceedings of the 56th Annual Meeting of the Association for Computational Linguistics (Long Papers), Jul. 2018, pp. 2556-2565.

Vedantam, et al., "CIDEr: Consensus-based Image Description Evaluation," CVF Open Access version of paper in IEEE Conference on Computer Vision and Pattern Recognition, CVPR 2015, Jun. 2015, pp. 4566-4575.

Wang, et al., "VATEX: A Large-Scale, High-Quality Multilingual Dataset for Video-and-Language Research," CVF Open Access version of a paper in 2019 IEEE/CVF International Conference on Computer Vision, ICCV 2019, 2019, pp. 4581-4591.

Williams, et al., "A Broad-Coverage Challenge Corpus for Sentence Understanding through Inference," in Proceedings of the 2018 Conference of the North American Chapter of the Association for Computational Linguistics: Human Language Technologies, vol. 1 (Long Papers), pp. 1112-1122.

Vaswani, et al., "Attention Is All You Need," arXiv:1706.03762v5 [cs.CL], Dec. 6, Dec. 2017, 15 pages.

Devlin, et al., "BERT: Pre-training of Deep Bidirectional Transformers for Language Understanding," arXiv:1810.04805v2 [cs.CL], May 24, 2019, 16 pages.

"Cross entropy," available at https://en.wikipedia.org/wiki/Cross_entropy, Wikipedia article, accessed on May 27, 2021, 4 pages.

Fang, et al., "From Captions to Visual Concepts and Back," arXiv:1411.4952v3 [cs.CV], Apr. 14, 2015, 10 pages.

\* cited by examiner

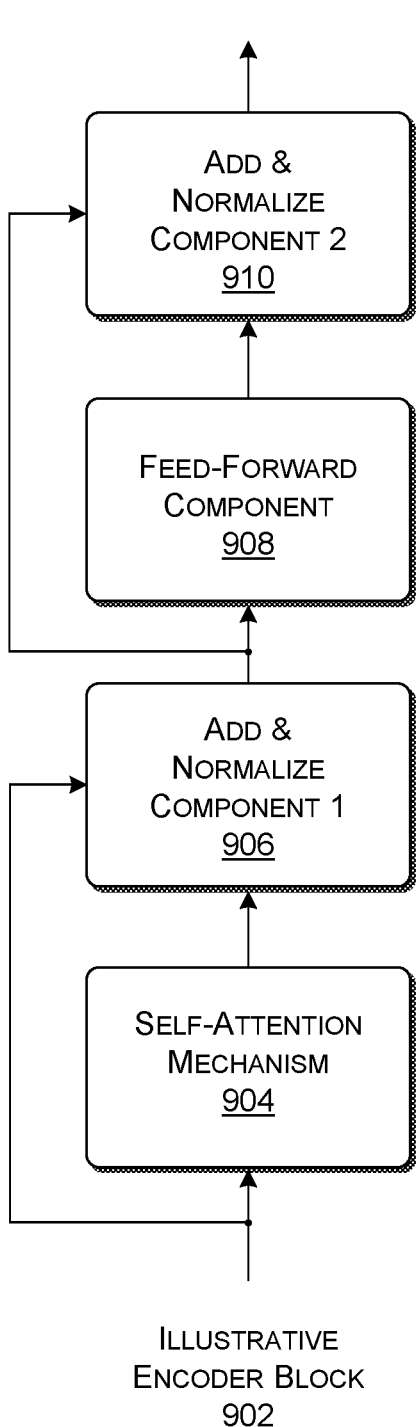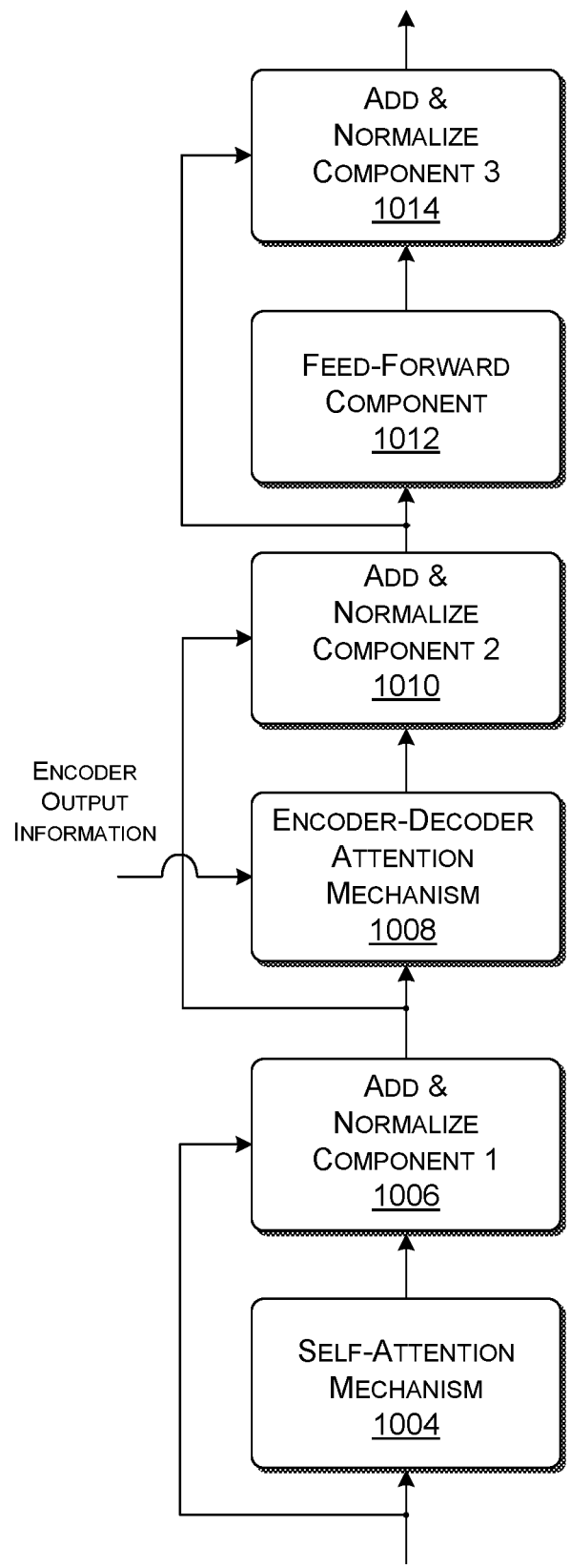
FIG. 9
FIG. 10

OVERVIEW OF OPERATION OF THE TRAINING SYSTEM 1102

FOR A PARTICULAR TRAINING EXAMPLE OF LINGUISTIC INFORMATION, OBTAIN A SOURCE ITEM, A TARGET ITEM, A FIRST AUXILIARY ITEM, AND A SECOND AUXILIARY ITEM, THE FIRST AND SECOND AUXILIARY ITEMS CONVEYING KNOWLEDGE ABOUT THE SOURCE ITEM THAT IS SUPPLEMENTAL TO ANY INFORMATION CONVEYED BY THE SOURCE ITEM ITSELF, AND THE TARGET ITEM REPRESENTING A TRANSFORMED COUNTERPART OF THE SOURCE ITEM.
1104

IN A FIRST PROCESSING PATH: FORM A FIRST INSTANCE OF INPUT INFORMATION BY COMBINING THE SOURCE ITEM AND THE FIRST AUXILIARY ITEM; TRANSFORM THE FIRST INSTANCE OF INPUT INFORMATION INTO FIRST-PATH ENCODER OUTPUT INFORMATION USING A FIRST-PATH ENCODER; AND TRANSFORM THE FIRST-PATH ENCODER OUTPUT INFORMATION INTO FIRST-PATH DECODER INFORMATION USING A FIRST-PATH DECODER.
1106

IN A SECOND PROCESSING PATH: FORM A SECOND INSTANCE OF INPUT INFORMATION BY COMBING THE SOURCE ITEM AND THE TARGET ITEM; AND TRANSFORM THE SECOND INSTANCE OF INPUT INFORMATION INTO SECOND-PATH ENCODER OUTPUT INFORMATION USING A SECOND-PATH ENCODER.
1108

IN A THIRD PROCESSING PATH: FORM A THIRD INSTANCE OF INPUT INFORMATION BY COMBINING THE SOURCE ITEM AND THE SECOND AUXILIARY ITEM; AND TRANSFORM THE THIRD INSTANCE OF INPUT INFORMATION INTO THIRD-PATH DECODER OUTPUT INFORMATION USING A THIRD-PATH ENCODER AND A THIRD-PATH DECODER.
1110

UPDATE TRAINING WEIGHTS BASED ON LOSS INFORMATION GENERATED USING THE FIRST PROCESSING PATH, THE SECOND PROCESSING PATH, AND THE THIRD PROCESSING PATH, THE METHOD BEING REPEATING FOR ADDITIONAL TRAINING EXAMPLES IN A TRAINING DATA SET, THE MACHINE-TRAINED MODEL THAT IS PRODUCED BY THE METHOD CORRESPONDING TO A TRAINED COUNTERPART OF THE FIRST-PATH ENCODER AND THE FIRST-PATH DECODER.
1112

FIG. 11

FURTHER DETAILS REGARDING BLOCK 1112 OF FIG. 11

GENERATE FIRST LOSS INFORMATION BASED ON A COMPARISON OF THE FIRST-PATH DECODER OUTPUT INFORMATION AND THE TARGET ITEM.
1202

GENERATE, BASED ON ENCODER-LEVEL CONTRASTIVE LEARNING, SECOND LOSS INFORMATION BASED ON COMPARISON OF THE FIRST-PATH ENCODER OUTPUT INFORMATION AND THE SECOND-PATH ENCODER OUTPUT INFORMATION.
1204

GENERATE, BASED ON DECODER-LEVEL CONTRASTIVE LEARNING, THIRD LOSS INFORMATION BASED ON A COMPARISON OF THE FIRST-PATH DECODER OUTPUT INFORMATION AND THE THIRD-PATH DECODER OUTPUT INFORMATION.
1206

UPDATE THE MACHINE-TRAINED MODEL BASED ON THE FIRST LOSS INFORMATION, THE SECOND LOSS INFORMATION, AND THE THIRD LOSS INFORMATION.
1208

FIG. 12

RESOURCE-EFFICIENT SEQUENCE GENERATION WITH DUAL-LEVEL CONTRASTIVE LEARNING

BACKGROUND

Developers continually strive to increase the accuracy and versatility of natural language processing (NLP) models. The developers may attempt to accomplish these goals by increasing the complexity of the NLP models. While these enhanced models may exhibit improved accuracy, they may also impose inference-stage costs that limit their effectiveness. For instance, an improved NLP model may consume a significant amount of system resources (e.g., processor resources, memory resources, etc.). This factor may make an application that uses the improved NLP model unsuitable for implementation on a resource-constrained computing platform. An improved NLP model may also increase the amount of time it takes for an application to produce its output results. This factor may make an application that uses the improved NLP model unsuitable for use in an application that demands real-time responses to user inputs.

SUMMARY

A training system is described herein for producing a resource-efficient machine-trained model. In some non-limiting implementations, the technology uses a training architecture that includes plural training paths that operate on plural respective instances of input information. Some of the training paths accept input information that incorporates external knowledge about source items being processed, beyond that imparted by the source items themselves. Further, the training system uses contrastive learning at different levels within the training architecture. For instance, the training architecture uses encoder-level contrastive learning to compare output information generated by different encoders within the training architecture. The training architecture uses decoder-level contrastive learning to compare output information produced by different decoders within the training architecture.

According to some non-limiting implementations, the training system performs its constative learning based on information stored in buffer memory. The information in buffer memory is updated on a first-in-first-out (FIFO) basis.

According to some non-limiting implementations, the training system uses back-propagation to update training weights in some parts of training architecture. It updates the training weights in other parts of the training architecture in an indirect manner, based on the training weights that have been computed by back-propagation.

Also described herein is an inference-stage system that employs the model produced by the training system. The inference-stage system generates a sequence using auto-regression, given an input source item.

The training system described above produces a machine-trained model that exhibits high accuracy relative to some competing models. The model achieves high accuracy, in part, based on the training system's incorporation of external knowledge in the training process, and through the training system's use of encoder-level contrastive learning and decoder-level contrastive learning. At the same time, the model produced by the training system makes efficient use of computer resources and exhibits good latency-related performance. These factors enable developers to use the model in resource-constrained computing platforms, and in applications that demand low-latency responses (such applications that demand real-time responses to user inputs).

According to another technical benefit, the training system's use of FIFO buffer memory and its selective use of back-propagation allows it to produce the machine-trained model in a resource-efficient manner. The use of buffer memory also allows the training system to increase the amount of data that is used to perform contrastive learning, which positively contributes to the accuracy of the resultant model produced by the training system.

The above-summarized elements can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 9 shows an illustrative encoder block for use in the encoder of FIG. 8.

FIG. 10 shows an illustrative decoder block for use in the decoder of FIG. 8.

FIG. 11 is a flowchart that shows an overview of one manner of operation of the training system of FIG. 1.

FIG. 12 is a flowchart that expands on the implementation of one of the processing blocks of FIG. 11.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a training system for producing a machine-trained model, and an inference-stage system for applying the machine-trained model produced by the training system. Section B sets forth illustrative methods that explain the operation of the systems of Section A. And Section C describes illustrative computing functionality that can be used to implement any aspect of the features described in Sections A and B.

A. Illustrative Computing Systems

A.1. Training System

Figure 1:
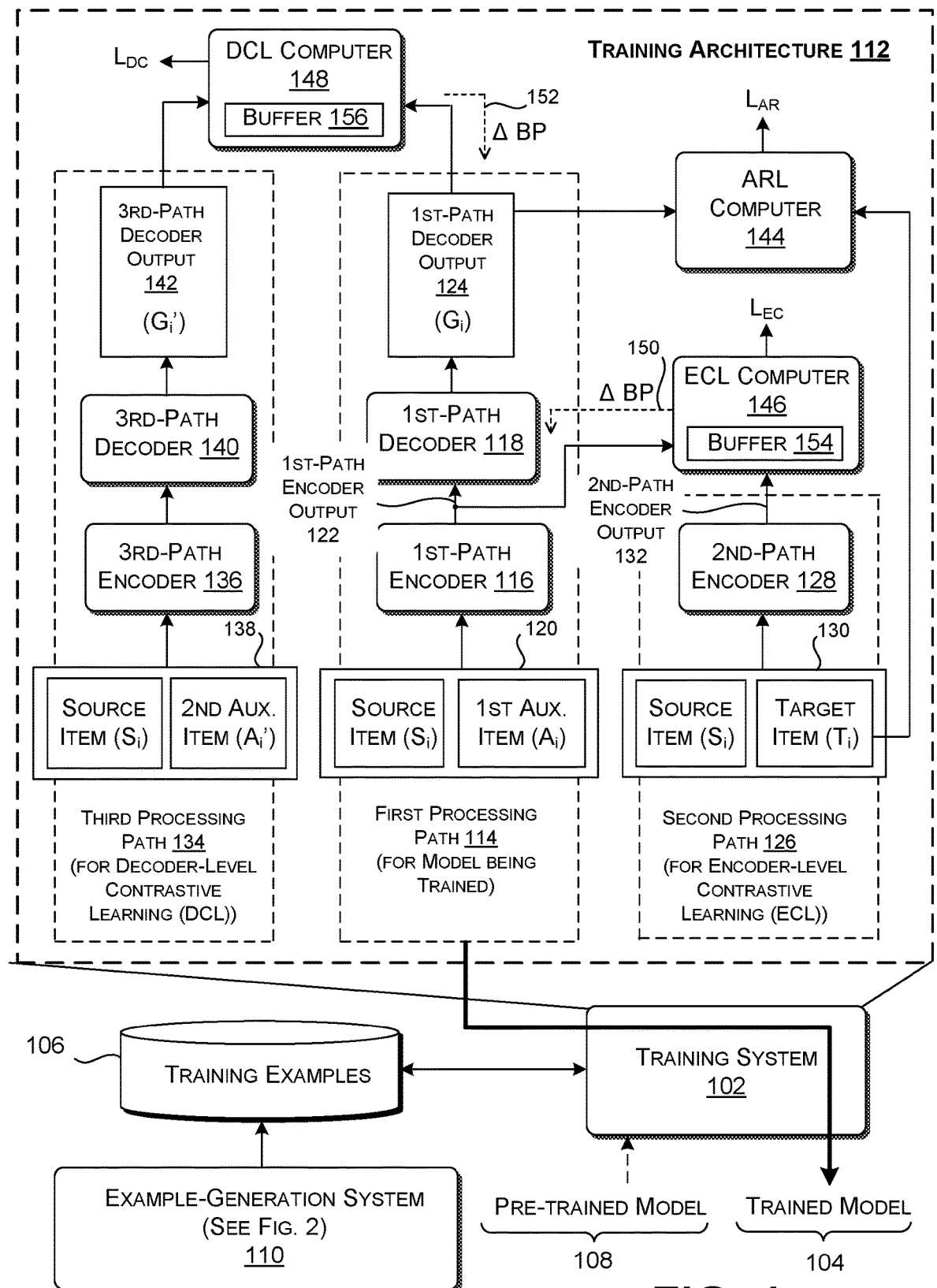
FIG. 1 shows an illustrative training system for producing a machine-trained model.

FIG. 1 shows an illustrative training system 102 for producing a machine-trained model 104. The machine-trained model 104 is configured to process an instance of linguistic input information expressed as a series of input tokens, where the tokens may correspond to words, n-grams, or other linguistic units. As will be explained in greater detail below, the machine-trained model 104 is configured to use auto-regression to successively convert the input information into a sequence of linguistic tokens. For example, the input information may specify a plurality terms that convey a plurality of concepts. The machine-trained model 104 can convert the input information into a coherent input sentence that incorporates the plural terms. In other cases, the input information expresses a query submitted by a user. The machine-trained model 104 can convert the query into a set of key terms.

This subsection will explain the training system 102 used to produce the machine-trained model 104. The next subsection (A.2) will set forth an inference-stage system that applies the machine-trained model 104 produced by the training system 102 to perform an application task.

With reference to FIG. 1, the training system 102 operates on training examples in a data store 106 on a batch-by-batch basis. Each batch has n training examples (where n is an environment-specific number chosen by the model developer). In the training process, the training system 102 updates training weights after processing each batch. In some implementations, the training system 102 begins its training based on a pre-trained language model 108 produced by a preliminary training process (not shown). The training system 102 then successively refines the training weights of the pre-trained language model 108. In other cases, the training system 102 can produce the machine-trained model 104 from "scratch," that is, without the use of the pre-trained model 108.

In some implementations, the training system 102 uses back-propagation in combination with stochastic gradient descent to update its training weights. In some implementations, the training system 102 uses momentum learning to update training weights in a resource-efficient manner. Additional details regarding the use of momentum learning are set forth below.

Figure 2:
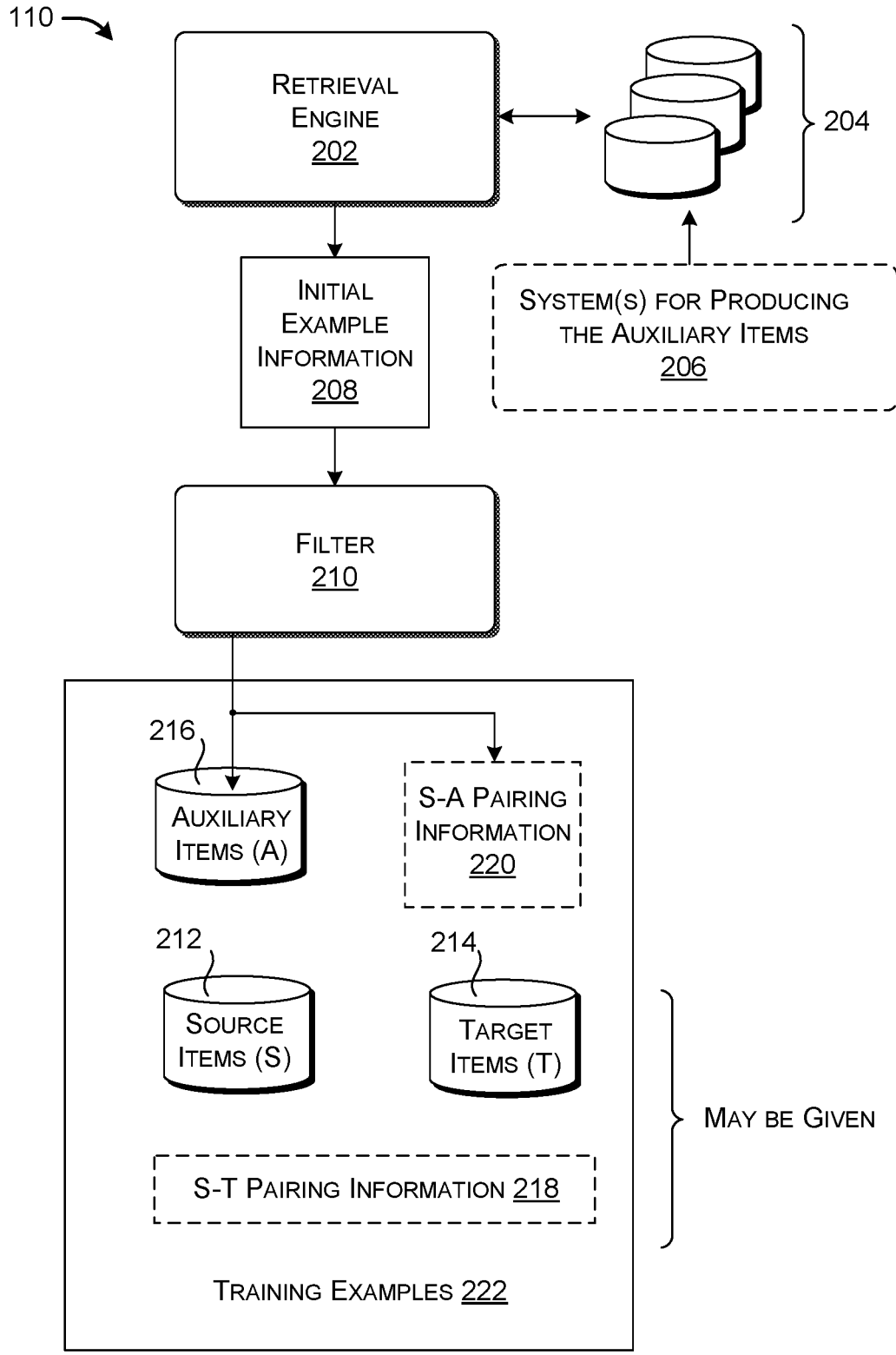
FIG. 2 shows an illustrative example-generation system for producing training examples to be processed by the training system of FIG. 1.

An example-generation system 110 generates the training examples in the data store 106. FIG. 2 shows one implementation of the example-generation system 110, and will be described in greater detail below. Suffice it to say here that any given training example includes plural data items, such as: a) a source item; b) a target item; and c) two or more auxiliary items. The source item pertains to an instance of linguistic input information, such as a set of terms associated with a plurality of respective concepts. The target item is a stipulated transformation of the source item that is deemed correct (for the case of a positive training example) or incorrect (for the case of a negative training example). For instance, the target item for a positive example may correspond to a sentence that combines the concepts conveyed by the source item in a manner that is deemed valid. An auxiliary item is information that imparts external knowledge about the source item. The knowledge is considered "external" and "supplemental" because it is obtained from a source (or sources) other than the source item itself. For example, consider a source item that sets forth a set of concept-related terms. An auxiliary item for that source item may originate from a knowledge base that provides information regarding the concepts and/or which describes the connections among the concepts, etc.

The training system 102 uses a training architecture 112 that includes plural processing paths. This description will use the qualifiers "first," "second" and "third" to describe these paths and the components used in the respective paths. However, note that these qualifiers are arbitrary designations intended to facilitate explanation by unambiguously identifying elements, and do not imply an ordering of parts or processing steps.

The training architecture 112 will be explained below with reference to the processing a single training example i that includes a source item $S_i$, a corresponding target item $T_i$, a first auxiliary item $A_i$, and a second auxiliary item $A_i'$. However, as will be clarified below, the training architecture 112 can alternatively process a batch of several training examples at the same time. The training system 102 can use a processing architecture that includes plural graphic processing units (GPUs) (not shown) and/or plural neural processing units (NPUs) operating in parallel to process the training examples in the batch.

A first processing path 114 includes a first-path encoder 116 and a first-path decoder 118. When training is finished, the fully trained first-path encoder 116 and first-path decoder 118 serve as the machine-trained model 104. FIG. 1 illustrates this point by showing an arrow connecting the first processing path 114 to the machine-trained model 104.

In operation, the first-path encoder 116 converts a first instance of input information 120 into first-path encoder output information 122. The first-path decoder 118 converts the first-path encoder output information 122 into first-path decoder output information 124. The first instance of input information 120 includes the source item $S_i$ combined (e.g., concatenated) with the first auxiliary item $A_i$. The first-path decoder output information 124 includes a generated sequence $G_i$ that is the counterpart of the target item $T_i$ in the training example. If the first processing path 114 produces an accurate result, $G_i$ will be close to $T_i$ in vector space, when both are mapped into the same vector space.

A second processing path 126 uses a second-path encoder 128 to map a second instance of input information 130 into second-path encoder output information 132. The second instance of input information 130 includes the source item $S_i$ combined (e.g., concatenated) with the target item $T_i$.

A third processing path 134 uses a third-path encoder 136 to map a third instance of input information 138 into third-path encoder output information (not labeled in FIG. 1). It then uses a third-path decoder 140 to map the third-path encoder output information into third-path decoder output information 142, which includes another generated sequence denoted by $G_i'$. The third instance of input information 138 includes the source item $S_i$ combined with the second auxiliary item $A_i'$. Thus, the third processing path 134 can be viewed as the same as the first processing path 114, with the exception that these two processing paths (114, 134) operate on different respective auxiliary items ($A_i$, $A_i'$).

An auto-regressive loss (ARL) computer 144 compares the first-path decoder output information 124 with the target item $T_i$, to generate a first measure of loss $L_{AR}$. An encoder-level contrastive learning (ECL) computer 146 compares the first-path encoder output information 122 with the second-path encoder output information 132 to generate a second loss measure $L_{EC}$. A decoder-level contrastive learning (DCL) computer 148 compares the first-path decoder output information 124 with the third-path decoder output information 142 to generate a third loss measure $L_{DC}$.

The training system 102 updates the training weights of the training architecture 112 based on the combination of the above-described three loss measures ($L_{AR}$, $L_{EC}$, $L_{DC}$) More specifically, the training system 102 can use momentum contrastive learning to update the training weights used in the first training path 114 based on the loss information computed as described above, e.g., by propagating gradients associated with the loss information through the first processing path 114 via back-propagation. The arrows (150, 152) denote these back-propagation operations. In contrast, the training system 102 can update the training weights in the second processing path 126 and the third processing path 134 as a mathematical function of the updated weights that have already been computed for the first processing path 114, without the separate use of back-propagation. This manner of operation simplifies the weight-updating operation, and correspondingly reduces the training system's consumption of computer resources. Additional detail regarding this updating operation will be set forth below when describing FIGS. 3-6, particularly with respect to the manner in which the ECL computer 146 and the DCL computer 148 leverage respective buffer memories (154, 156).

More generally stated, contrastive learning enables the training system 102 to produce a machine-trained model 104 of high accuracy by promoting the similarity between items that compose a positive pairing of two items (q, k)⁺ while simultaneously confirming the dissimilarity between each of a plurality of negative training examples (q, k)⁻. A positive pairing describes a case in which the two items (q and k) are related to each other, and a negative pairing describes a case in which the two items (q and k) are not related to each other. The symbol q (a particular "query") and the symbol k (a particular "key") are used herein as shorthand generic designators to refer to any two items being compared. For instance, in one application, the query q may represent an expression of the first-path encoder output information 122 and the key k may represent an expression of the second-path encoder output information 132. To repeat, additional detail regarding how the training system 102 performs contrastive learning will be set forth below.

FIG. 2 shows one implementation of the example-generation system 110 introduced in FIG. 1. As stated, this system 110 generates the training examples that the training system 102 uses to train the machine-trained model 104. The example-generation system 110 can operate in different ways in different respective environments, based, in part, on what data sources are available for use by a model developer. In some implementations, the developer already has a corpus of pre-generated pairs of data items, each of which includes a particular source item and a corresponding target item. Here, the role of the example-generation system 110 is to identify one or more auxiliary items for each source item. In other implementations, the developer does not have access to pre-generated pairs of source items and target items. Here, the example-generation system 110 may perform the additional preliminary task of identifying pairs of source items and respective target items. To facilitate explanation, the following explanation will assume that the former scenario applies, and, accordingly, the principal role that the example-generation system 110 performs is to identify auxiliary items, given respective source items.

The example-generation system 110 can use a retrieval engine 202 to retrieve auxiliary items from one or more data sources 204, given specified source items. One or more systems 206 can generate or otherwise supply the items in the data sources 204. The retrieval engine 202 can operate using different environment-specific retrieval strategies. In some implementations, assume that one or more data sources 204 explicitly associate source items with respective auxiliary items. Here, the retrieval engine 202 uses each source item as a lookup key to interrogate the data source(s). The retrieval engine then retrieves whatever knowledge is imparted by the data source(s) for the specified source item. Data sources of this type can be structured as dictionaries, digests, lookup tables, knowledge graphs, etc.

In addition, or alternatively, the retrieval engine 202 can perform a feature-based search to find a matching auxiliary item, given a specified source item. For instance, the retrieval engine 202 can identify the features of a given source item. The retrieval engine 202 can then consult a search index (not shown) to find another information item having matching features. The features used to perform this matching can include any combination of lexical features, TD-IDF features, semantic vectors, etc.

For example, given a set of concepts associated with a candidate source item, the retrieval engine 202 can consult a search index to identify a Wikipedia article that matches those concepts. The retrieval engine 202 can then select one or more sentences from this article (and/or the title of this article) as appropriate auxiliary items with respect to the specified source item. In some implementations, the retrieval engine 202 can perform this search by matching keywords in the source item with the same keywords in the Wikipedia article. Alternatively, or in addition, the retrieval engine 202 can perform this search by mapping the source item into a source vector, and then finding the Wikipedia article having a corresponding article vector that is within a prescribed distance to the source vector in a shared vector space. The distance between vectors can be measured by cosine similarity or any other distance metric.

In addition, or alternatively, the retrieval engine 202 can provide an interface that allows one or more users to manually specify auxiliary items for specified source items. For example, the retrieval engine 202 can provide a crowd-sourcing platform that allows users to specify auxiliary items, given respective source items.

The above-described implementations of the retrieval engine 202 are set forth here in the spirit of illustration, not limitation; other environments can use other implementations of the retrieval engine 202. In any event, the retrieval engine 202 produces initial example information 208.

A filter 210 removes training examples that fail to satisfy a prescribed quality metric. For example, the filter 210 can use a machine-trained classification model to generate a score for a given pair that includes a candidate source item and a candidate auxiliary item. The score reflects an extent to which the candidate auxiliary item provides supplemental information that is relevant to candidate source item. The filter 210 can remove any pairing of items having a score below an environment-specific threshold value. Without limitation, the classification model can be implemented as any of a logistic regression model, a transformer-based model, a decision tree model, and so on.

The example-generation system 110 provides a plurality of source items (in a data store 212) (which may optionally be given), a plurality of target items (in a data store 214) (which may optionally be given), and a plurality of auxiliary items (in a data store 216). The example-generation system 110 can include information 218 that describes the links between matching source items and respective target items (which may optionally be given), and information 220 that describes the links between matching source items and respective auxiliary items. This information collectively composes a plurality of training examples 222 for processing by the training system 102.

As noted above, in other implementations, the example-generation system 110 can perform a more expansive role in generating the training examples 222. For example, the example-generation system 110 can generate the target items, given respective source items. The example-generation system 110 can perform this task using one more other machine-trained models. For example, the example-generation system 110 can use a first machine-trained model to map images into respective sets of concepts (corresponding to candidate source items). The example-generation system 110 can use a second machine-trained model to map the same images into respective sentences (corresponding to respective target items). Or it can adopt whatever captions are already associated with the images. For a given image, the concept set and its sentence correspond to a pair composed of a source item $S_i$ and a target item $T_i$. One example of technology for extracting linguistic information from images is set forth by Microsoft Corporation of Redmond, WA, in FANG, et al., "From Captions to Visual Concepts and Back," arXiv:1411.4952v3 [cs.CV], Apr. 14, 2015, 10 pages. Further, the example-generation system 110 can use the filter 210 to remove pairs of source items and target items that fail to satisfy prescribed quality metrics.

Figure 3:
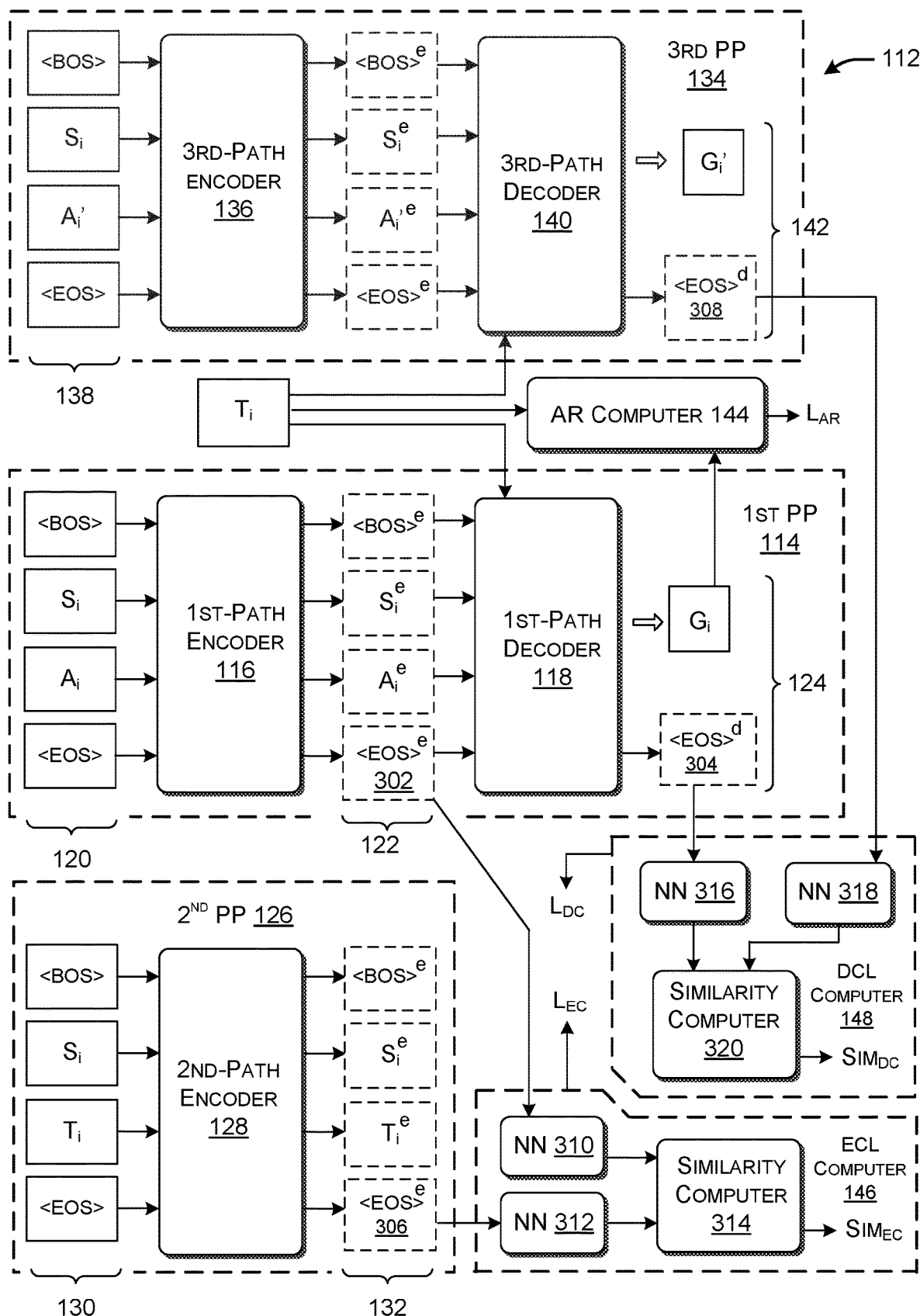
FIG. 3 shows one implementation of a training architecture used by the training system of FIG. 1.

FIG. 3 shows one implementation of the training architecture 112 introduced before. Elements in FIGS. 1 and 3 that have the same reference numbers correspond to the same parts. As will be described below in greater detail, the training architecture 112 generates some of its output information in successive fashion, e.g., by generating one token at a time. However, so as not to overburden the explanation at this stage, the iterative nature of the training architecture 112 will not be specifically emphasized in the description of FIG. 3.

Referring first to the first processing path (PP) 114 in the middle of FIG. 3, the first instance of input information 120 incudes the source item $S_i$ and the first auxiliary item $A_i$. The first instance of input information 120 optionally includes a special beginning-of-sequence <BOS> token that demarcates the beginning of the sequence of input information 120, and a special end-of-sequence <EOS> token that demarcates the end of the input information 120. The first-path encoder 116 uses a neural network (described below) to map the first instance of input information 120 into the first-path encoder output information 122. The first-path encoder output information 122 includes hidden state information associated with each part of the first instance of input information 120. For instance, the hidden state information <EOS>$^e$ 302 denotes the hidden state counterpart of the <EOS> token in the first instance of input information 120 (where the "e" in this context represents encoded information). The first-path encoder 116 uses the same trained weights to produce each part of the first-path encoder output information 122.

The first-path decoder 118 uses another neural network (described below) to transform the first-path encoded output information 122 into the first-path decoder output information 124. The first-path decoder output information 124, in turn, includes the generated sequence $G_i$ that represents the transformed counterpart of the source item $S_i$ (and its encoded counterpart). It also includes information <EOS>$^d$ 304 that denotes the transformed version of the <EOS> token in the first instance of input information 120 (and its encoded counterpart). The symbol "d" represents that this is information generated by a decoder. The first-path decoder 118 uses the same trained weights to produce all parts of the first-path decoder output information 124. As such, the first-path decoder 118 uses the same trained weights to produce the information <EOS>$^d$ 304 and the generated sequence $G_i$.

The second processing path 126 uses the second-path encoder 128 to map the second instance of input information 130 into the second-path output information 132. The second-path output information 132, in turn, includes information <EOS>$^e$ 306 that represents the hidden state encoded counterpart of an <EOS> token in the second instance of input information 130. As previously explained, the second instance of input information 130 includes the source item $S_i$ and its corresponding target item $T_i$.

The third processing path 134 uses the third-path encoder 136 and the third-path decoder 140 to map the third instance of input information 138 into the third-path decoder output information 142. The third-path decoder output information 142, in turn, incudes a generated sequence $G_i'$. It also includes information <EOS>$^d$ 308 that denotes the hidden state decoded counterpart of an <EOS> token in the third instance of input information 138. As previously explained, the third instance of input information 138 includes the source item $S_i$ in combination with the second auxiliary item $A_i'$.

The auto-regressive loss (ARL) computer 144 can generate a measure of the auto-regressive generation loss $L_{AR}$ over a set of training examples using any loss function, such as a cross-entropy loss function. The ARL computer 144 computes cross-entropy for a predicted token in the generated sequence $G_i$ (given the tokens that have already been predicted in the sequence $G_i$) by taking the log of the predicted token's probability (which can be calculated using a softmax operation, also known as a normalized exponential function), and then forming the product of that log with whatever token is expected (as defined by the corresponding target item $T_i$). The ARL sums the above measure over plural comparisons between generated and expected results.

The encoder-level contrastive learning (ECL) computer 146 includes a first neural network (NN) 310 for mapping the information <EOS>$^e$ 302 produced by the first-path encoder 116 into a vector $z_q$. The ECL computer 146 includes a second neural network 312 for mapping the information <EOS>$^e$ 306 produced by the second-path encoder 128 into another vector $z_k$, in the same vector space as the vector $z_q$. The neural networks (310, 312) can be constructed using any number of layers, and can use any activation function(s). In some implementations, they may be implemented as multilevel perceptron networks (MLPs). A similarity computer 314 generates any type of measure of the distance between $z_q$ and $z_k$. Overall, the ECL computer 146 generates the encoder-level contrastive loss measure $L_{EC}$ based on a summation of the above similarity measures computed over plural comparisons.

Similarly, the decoder contrastive learning (DCL) computer 148 includes a first neural network 316 for mapping the information <EOS>$^d$ 304 produced by the first-path decoder 118 into a vector $z_q$. The DCL computer 148 includes a second neural network 318 for mapping the information <EOS>$^d$ 308 produced by the third-path decoder 140 into a vector $z_k$ within the same vector space as the vector $z_q$. The neural networks (316, 318) can be constructed using any number of layers, and can use any activation function(s). In some implementations, they may be implemented as multilevel perceptron networks (MLPs). A similarity computer 320 generates any type of measure of the distance between $z_q$ and $z_k$. Overall, the DLC computer 148 generates the decoder-level constative loss measure $L_{DC}$ based on a summation of the above similarity measures computer over plural comparisons.

More specifically, the ECL computer 146 and the DCL computer 148 can use the following non-limiting equation to calculate contrastive loss, denoted generically below as $L_c$:

$$L_c = -\sum_{i \in I} \sum_{p \in P(i)} \frac{1}{|P(i)|} \log\left(\frac{\exp(z_{q_i} \cdot z_{k_p}/\tau)}{\sum_{j \in M} \exp(z_{q_i} \cdot z_{k_j}/\tau)}\right). \quad (1)$$

In Equation (1), i represents an index of a particular sample in a batch I under consideration. P(i) represents a set of all positive samples for index i, and |P(i)| represents the ordinality of the set. A positive sample ($k_p$) represents a correct (ground-truth) counterpart of the sample at index i. $\tau$ represents a temperature hyper-parameter.

More generally, the outer summation of Equation (1) steps through each sample i in the batch I. The inner summation of Equation (1) steps through each positive sample p with respect to a sample i under consideration. With reference to the term enclosed by the innermost parentheses, the numerator expresses the dot product of the vector $z_q$ for the sample i with the vector $z_k$ for a particular positive example p under consideration. The dot product expresses the difference between these two vectors. The exponential of this product is normalized by a sum of similarly-computed dot products, which is expressed by the denominator of the equation.

The training system 102 generates a final loss measure as a weighted sum of $L_{AR}$, $L_{EC}$, and $L_{DC}$, e.g., as $L_{AR} + \lambda_{EC} L_{EC} + \lambda_{DC} L_{DC}$, where $\lambda_{EC}$ and $\lambda_{DC}$ are scalar weighting parameters. The training system 102 then proceeds to update the training weights in the training architecture 112 based on the calculated weights. More specifically, assume that the training weights of the first-path encoder 116 are generically denoted by $\theta_q^{e1}$ and the training weights of the first-path decoder 118 are generically denoted by $\theta_q^{d1}$. The training system 102 updates these training weights using back-propagation.

In contrast, the training system 102 updates the weights in the second processing path 126 and the third processing path 134 in indirect fashion, based on the training weights that have been calculated for the first processing path 114 (without separately performing back-propagation). Let $\theta_k^{e2}$ represent the training weights used by the second-path encoder 128. The training system 102 can update these weights using $\theta_k^{e2} \leftarrow m\theta_k^{e2} + (1-m)\theta_q^{e1}$. Here, $\theta_k^{e2}$ on the right side of the equation represents the current training weights used by the second-path encoder 128, while $\theta_k^{e2}$ on the left side of the equation represents the updated training weights. The symbol m represents a constant value that is close to 1.0 (e.g., 0.9). By choosing a value of m close to 1.0, the training system 102 slows the change in the existing training weights of the second-path encoder 128. The training system 102 updates the training weights of the third-path decoder 140 in the same manner set forth above for the second-path encoder 128. That is, the training system 102 updates the training weights of the third-path decoder using the equation: $\theta_k^{d3} \leftarrow m\theta_k^{d3} + (1-m)\theta_q^{d1}$.

By virtue of this indirect manner of updating training weights, the training system 102 can simplify the training operation and reduce the consumption of computing resources in the training operation. More specifically, the training system 102 consumes a significant amount of processing and memory resources in performing back-propagation. By reducing the amount of training weights that are updated via back-propagation, the training system 102 can reduce the consumption of computing resources. The use of above-described update strategy also ensures that the training system 102 learns the training weights in a controlled fashion, e.g., by minimizing large oscillations of values in the training weights.

Figure 4:
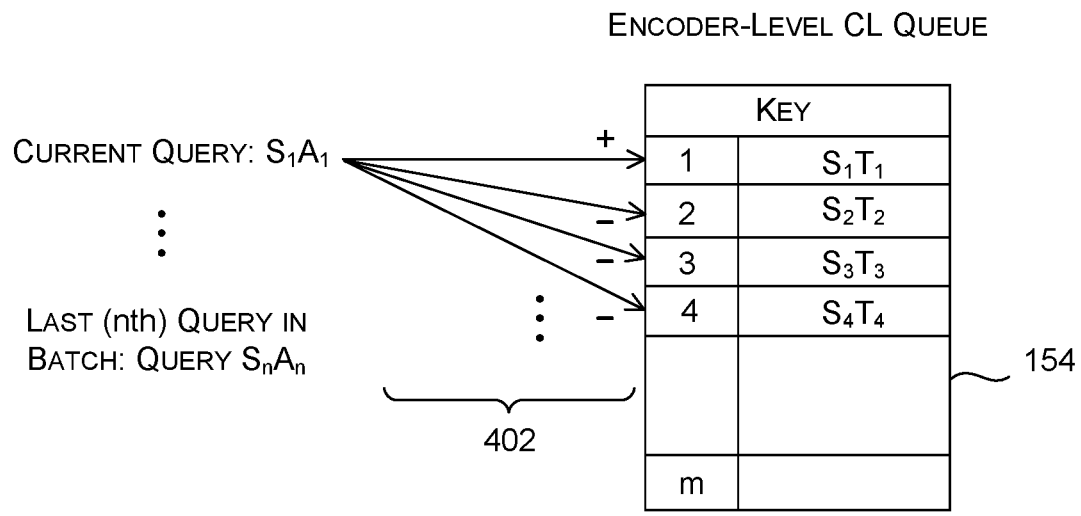
FIG. 4 shows buffer memories used by the training system of FIG. 1 in generating encoder-level loss information.

FIG. 4 shows a buffer memory 154 used by the ECL computer 146 in the course of generating the encoder-level loss information $L_{EC}$. This buffer memory 154 contains a set of the last m entries that have been processed by the second-path encoder 128, generically referred to as keys, each of which includes a pairing of a particular encoded source item $S^e$ and a particular target item $T^e$ produced by the second-path encoder 128. The training system 102 also maintains a data structure 402 that identifies the correlation between each query q and the keys ($k_1$, $k_2$, ... $k_m$) in the buffer memory 154. Here, the query q represents a pairing of a particular encoded source item $S^e$ and a particular first auxiliary item $A^e$ produced by the first-path encoder 116. That is, the data structure 402 identifies a matching query and key as a positive training example (+), and an unmatched query and key as a negative training example (−). This correlation is identified for the n queries in a batch, where n<m. Although FIG. 4 shows that each query has a single positive key, any given query can match plural keys, and any given key can match plural queries.

Figure 5:
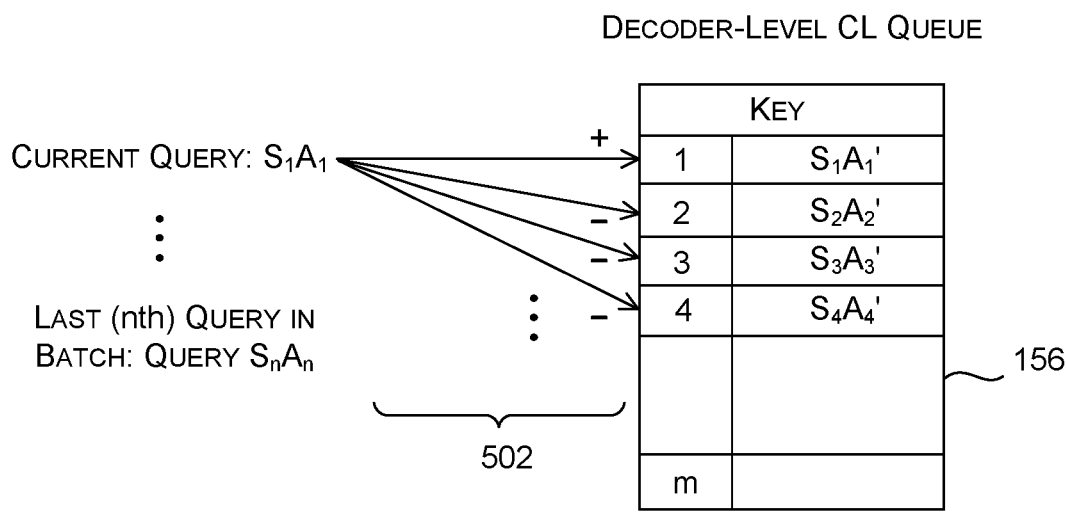
FIG. 5 shows buffer memories used by the training system of FIG. 1 in generating decoder-level loss information.
Figure 6:
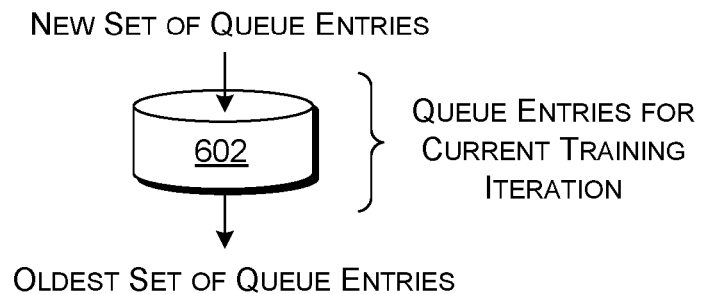
FIG. 6 shows a first-in-first-out manner of operation of the buffer memories of FIGS. 4 and 5.

Similarly, FIG. 5 shows a buffer memory 156 used by the DCL computer 148 in the course of generating the decoder-level loss information $L_{DC}$. This buffer memory 156 contains a set of the last m entries that have been processed by the third-path decoder 140, generically referred to as keys, each of which includes a pairing of a particular decoded source item $S^d$ and a particular second auxiliary item $A^{\prime d}$ produced by the third-path decoder 140. The training system 102 also maintains a data structure 502 that identifies the correlation between each query q and the keys ($k_1$, $k_2$, ... $k_m$) in the buffer memory 156. Here, the query q represents a pairing of a particular decoded source item $S^d$ and a particular decoded first auxiliary item $A^d$ produced by the first-path decoder 118. This correlation is identified for the n queries in a batch, where n<m. Although FIG. 5 shows that each query has a single positive key, any given query can match plural keys, and any given key can match plural queries.

FIG. 6 illustrates how the training system 102 can update each buffer memory described above, generically represented in FIG. 6 as buffer memory 602. The training system 102 commences each training iteration by packaging together a block of new entries to be processed by the training architecture 112. The training system 102 can expresses this block as the concatenation of plural instances of the kind of input information illustrated in FIGS. 1 and 3. The training system 102 updates each buffer memory 602 by ejecting the oldest block of entries (which was stored last) in the buffer memory 602 and storing the block of new entries (which is designated as the newest entry).

Generally, the training system 102 relies on the buffer memories (154, 156) shown in FIGS. 4 and 5 to increase the number of entries that are used to compute $L_{EC}$ and $L_{DC}$, e.g., to encompass more entries than are present in any given batch. The training system 102 specifically relies on the buffer memories (154, 156) to increase the number of negative examples that are used to compute the loss information. This ability, in turn, enables the training system 102 to increase the accuracy of the machine-trained model 104 that it produces. The training system 102 relies on the FIFO strategy shown in FIG. 6 to ensure that the buffer memories (154. 156) store entries that are computed using training weights that are relatively up-to-date (because they were recently updated), while not overburdening the training system 102 by performing more frequent memory update operations.

Other implementations of the training system 102 can adopt other strategies for managing memory. For example, other implementations of the training system 102 can rely on a fixed dictionary of entries, or a dictionary of entries that is updated on some other basis than the FIFO strategy described above. Other implementations can use back-propagation to also update the encoders (128, 136) of the second processing path 126 and the third processing path 134, and to update the decoder 140 of the third processing path 134 (rather than indirectly computing the training weights of these components in the manner described above).

A.2. Inference-Stage System

Figure 7:
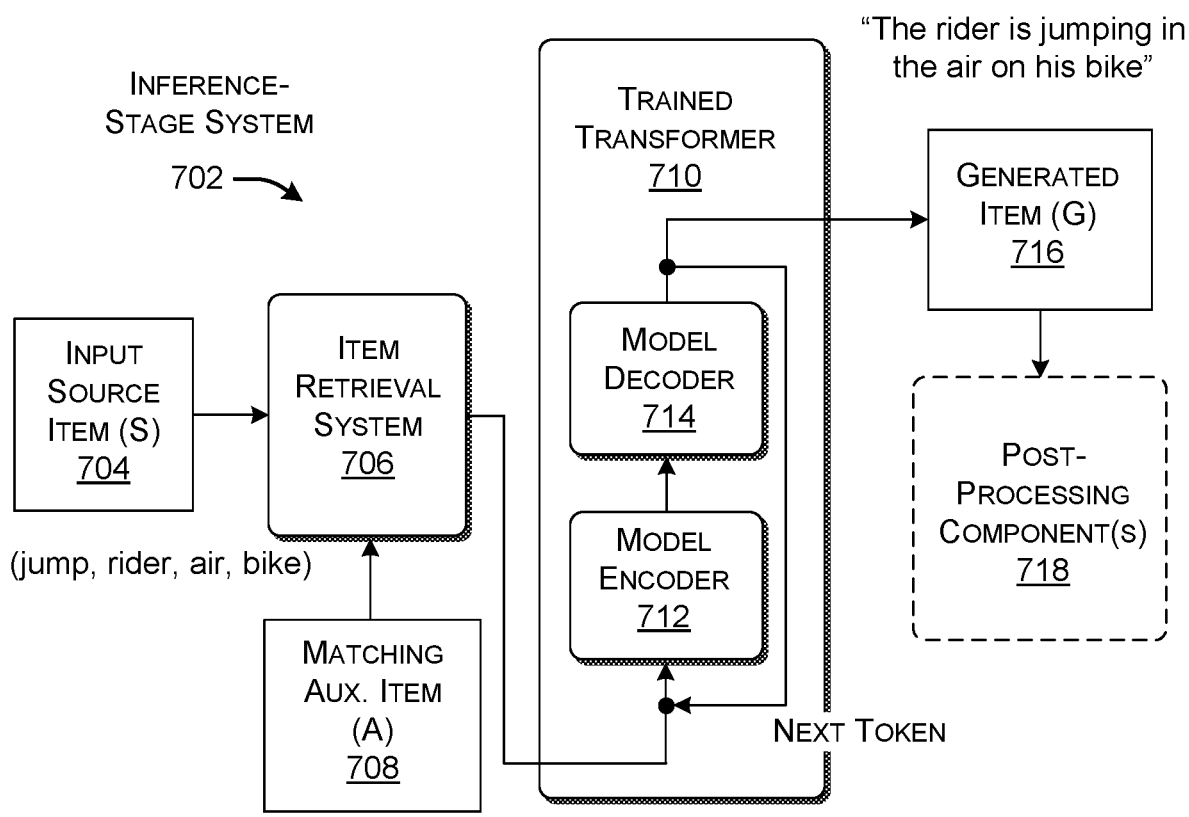
FIG. 7 shows an inference-level system that uses a machine-trained model produced by the training system of FIG. 1.

FIG. 7 shows an inference-stage system 702 that uses the machine-trained model 104 produced by the training system 102 of FIG. 1. Assume that the inference-stage system 702 receives a particular input source item $S_i$ 704. An item retrieval system 706 retrieves at least one auxiliary item $A_i$ 708 that is deemed related to the input source item from at least one data source of auxiliary items. Like the previously-described retrieval engine 202 (of FIG. 2), the inference-stage item retrieval system 706 can use various techniques to perform this task. For example, the item retrieval system 706 can use the source item as a lookup key to retrieve an auxiliary item that a data source explicitly identifies as being related to the source item. Data sources that can serve this role include lookup tables, dictionaries, digests, knowledge graphs, etc. In other implementations, the item retrieval system 706 can use any kind of feature-based search mechanism to identify an auxiliary item that matches a specified source item. For example, the item retrieval system 706 can map a given source item into a source vector, and consult a search index to find an auxiliary item that has a corresponding auxiliary vector that is within a prescribed distance to the source vector. The item retrieval system 706 can assess distance using any distance metric, such as cosine similarity. These examples of the of the item retrieval system 706 are described here in the spirit of illustration, not limitation; other implementations of the item retrieval system 706 can adopt yet other retrieval strategies.

The inference-stage system 702 can generate an instance of input information that mirrors that received by the first processing path 114 of FIG. 1. That is, the inference-stage system 702 can concatenate the source item 704 with the retrieved auxiliary item 708, and bracket this concatenated result with a <BOS> token and an <EOS> token.

A transformer 710 uses a model encoder 712 and a model decoder 714 to process the input information. The model encoder 712 is the trained counterpart of the first-path encoder 116 introduced in FIG. 1, while the model decoder 714 is the trained counterpart of the first-path decoder 118 introduced in FIG. 1. More specifically, the model encoder 712 maps the input information to encoder output information, and the model decoder 714 maps the encoder output information to decoder output information. As will be explained in greater detail below, the transformer 710 actually generates the decoder output information in an auto-regressive manner, e.g., token by token. When an end-of-sequence token is predicted, the transformer 710 outputs a fully generated sequence 716. Any type of optional post-processing component(s) 718 can perform any application-specific task(s) on the basis of the generated sequence 716.

In a first example, the source item corresponds to a set of concept terms, such as the concept terms ("jump," "rider," "air," "bike"). The transformer 710 produces a generated sequence that corresponds to a coherent sentence that uses these terms, such as the sentence "The rider is jumping in the air on his bike." A post-processing component can perform any application-specific task based on this generated sentence. For instance, assume that the concept terms originate from a classification engine that performs topic analysis on an image, e.g., by identifying regions of interest in the image, and then classifying the topics associated with the regions of interest. The post-processing component can annotate the image with the generated sentence.

In a second example, the source item corresponds to a query submitted by a user to a search engine via a browser application, or through some other kind of application. The transformer 710 produces a set of keywords based on the query, e.g., which have been previously specified by an advertiser. A post-processing component can match an advertisement with the identified keywords, and then serve the advertisement to the user who submitted the query.

Figure 8:
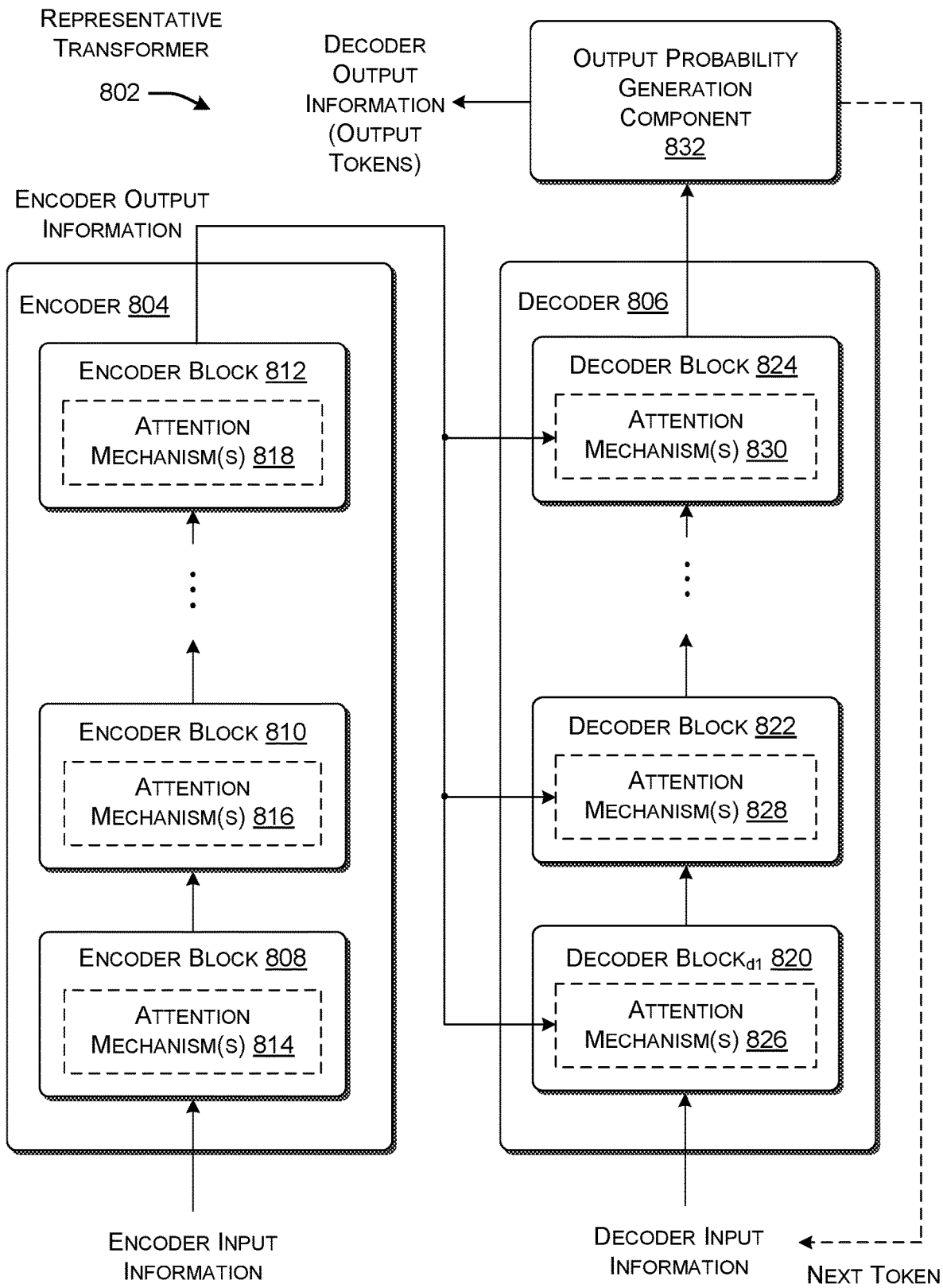
FIG. 8 shows an illustrative transformer that can be used to implement the inference-level system of FIG. 7, and different parts of the training system of FIG. 1. The transformer includes an encoder and a decoder.

FIG. 8 shows an illustrative transformer 802 that can be used by the inference-stage system 702 of FIG. 7. The transformer 802 includes an encoder 804 and a decoder 806. Note that each encoder of the training system 102 can use the same architecture as the representative encoder 804 shown in FIG. 8, and each decoder of the training system 102 can use the same architecture as the representative decoder 806 of FIG. 8. But the transformer 802 will be explained below primarily in the context of its inference-stage manifestation.

The encoder 804 receives encoder input information in the form of a series of input vectors. An input encoding component (not shown) produces the input vectors by converting a series of tokens that compose the linguistic information supplied to the transformer 802 into respective vectors (e.g., using a lookup table, machine-trained model, etc.), and then adding position information to the respective vectors which describes their position within the sequence of input vectors. The encoder 804 maps the encoder input information into encoder output information using a pipeline of encoder blocks (808, 810, . . . , 812), with each encoder block receiving its input information from a preceding encoder block (if any). The encoder blocks (808, 810, . . . , 812) include respective attention mechanisms (814, 816, . . . , 818).

The decoder 806 performs its processing based on both decoder input information and the encoder output information. Since the decoder 806 produces the generated sequence using auto-regression, the decoder input information includes, at any given time, the set of tokens that have been predicted thus far. The decoder 806 uses a pipeline of decoder blocks (820, 822, . . . , 824) to produce decoder output information, with each decoder block receiving input information from a preceding decoder block (if any). The decoder blocks (820, 822, . . . , 824) can include respective attention mechanisms (826, 828, 830).

An output probability generation component 832 can use a combination of a linear transformation operation and the softmax function to map the decoder output information into a probability distribution. The probability distribution identifies the probability associated with each word in an identified vocabulary. A search heuristic component can use any search heuristic to select from among the candidate tokens. In a greedy search heuristic, the search heuristic component selects the token having the highest probability at each time step. In a beam search heuristic, the search heuristic component selects a plurality of tokens having the highest probabilities.

Consider the operation of auto-regression for the case in which the greedy search heuristic is used. Upon predicting the next token, the decoder 806 adds this predicted token to the decoder input information, to produce updated decoder input information. The decoder 806 then repeats the above-described operations on the basis of the updated decoder input information, to produce a next token in the generated sequence. The decoder 806 adds this next token to the decoder input information, to produce yet another instance of updated decoder input information. The decoder 806 continues in this recursive manner until the output probability generation component 832 predicts that the next token is an end-of-sequence token. For the case in which the beam search heuristic is used, the decoder 806 performs the above tasks with respect to plural paths through a token search space.

FIG. 9 shows an illustrative and non-limiting encoder block 902. It includes a self-attention mechanism 904, an add-&-normalize component 906, a feed-forward component 908, and another add-&-normalize component 910. The self-attention mechanism performs self-attention. The first add-&-normalize component 906 adds the input information fed to the self-attention mechanism 904 to the output information provided by the self-attention mechanism 904 (thus forming a residual connection), and then performs layer-normalization on that result. Layer normalization entails adjusting values in a layer based on the mean and deviation of those values in the layer. The feed-forward component 908 uses one or more fully connected neural network layers to map input information to output information. The second add-&-normalize component 910 performs the same function as the first add-&-normalize component 906.

In some implementation, each attention mechanism in the self-attention mechanism 904 generates attention information using the following equation:

$$attn(Q, K, V) = \text{softmax}\left(\frac{QK^T}{\sqrt{d}}\right)V. \quad (2)$$

Query information Q is produced by multiplying the input vectors associated with the encoder input information by a query weighting matrix $W^Q$. Key information K and value information V are produced by multiplying the same input vectors by a key weighting matrix $W^K$ and a value weighting matrix $W^V$, respectively. (For clarity, note that the query information Q and key information K in Equation (2) represents different information items than the query q and the key k that appear in Equation (1)). Equation (2) involves taking the dot product of Q by the transpose of K, and then dividing that dot product by a scaling factor $\sqrt{d}$, where d may represent the dimensionality of the machine-learned model. This yields a scaled result. Equation (2) then involves computing the softmax of the scaled result, and then multiplying the result of the softmax operation by V. From a more general perspective, the self-attention mechanism 904 uses Equation (2) to determine the amount of focus (attention) that should be placed on each part of the input information, when processing a particular part of the input information under consideration.

FIG. 10 shows an illustrative and non-limiting example of a decoder block 1002. The decoder block 1002 includes a self-attention mechanism 1004, an add-&-normalize component 1006, encoder-decoder attention mechanism 1008, another add-&-normalize component 1010, a feed-forward component 1012, and another add-&-normalize component 1014. The self-attention mechanism 1004 performs masked self-attention on the decoder input information fed to it using Equation (2). The self-attention mechanism 1004 performs masking so that positions in a sequence after a last-predicted token (which are unknown at this time) do not bias its results.

On the other hand, the encoder-decoder attention mechanism 1008 performs cross-attention based on the output information generated by the encoder 804 and the output information supplied by the preceding component in the decoder block 1002 (i.e., the add-&-normalize component 1006). The encoder-decoder attention mechanism 1008 also uses Equation (2) to perform its functions, but the encoder-decoder attention mechanism 1008 uses the encoder output information to generate the key formation K and the value information V, and uses the output information fed to it by the add-&-normalize component 1006 to generate the query information Q. The add-&-normalize components (1006, 1010, 1014) and the feed-forward component 1012 perform the same functions described above for the encoder block 902.

The decoders that are used in the training system 102 also operate in an auto-regressive manner as described above. But each training-stage decoder successively processes the tokens that make up the target item rather than the tokens that are predicted by the output probability component 932.

In conclusion to Section A, the machine-trained model 104 produced by the training system 102 exhibits high accuracy relative to some competing models. The machine-trained model 104 achieves high accuracy, in part, based on the training system's incorporation of external knowledge in the training process, and through the training system's use of encoder-level contrastive learning and decoder-level contrastive learning. At the same time, the machine-trained model 104 produced by the training system 102 makes efficient use of computer resources and exhibits good latency-related performance. These factors enable developers to use the model in resource-constrained computing platforms, and in applications that demand low-latency responses (such applications that demand real-time responses to user inputs).

In other words, instead of increasing the complexity of the machine-trained model 104 itself (e.g., by adding additional layers and functions to a transformer-based architecture), the training system 102 uses a training architecture 112 that improves the accuracy of a resultant transformer-based model. The transformer-based model, because it does not incorporate additional layers or functions, can be expected to consume no more computer resources than some other transformer-based models. The transformer-based model can also be expected to offer latency-related performance that is no worse than some other transformer-based models.

According to another technical benefit, the training system's use of FIFO buffer memory and its selective use of back-projection allows it to produce the machine-trained model in a resource-efficient manner. The use of buffer memory also allows the training system 102 to increase the amount of data that is used to perform contrastive learning, which positively contributes to the accuracy of the resultant model produced by the training system 102.

B. Illustrative Processes

Figure 13:
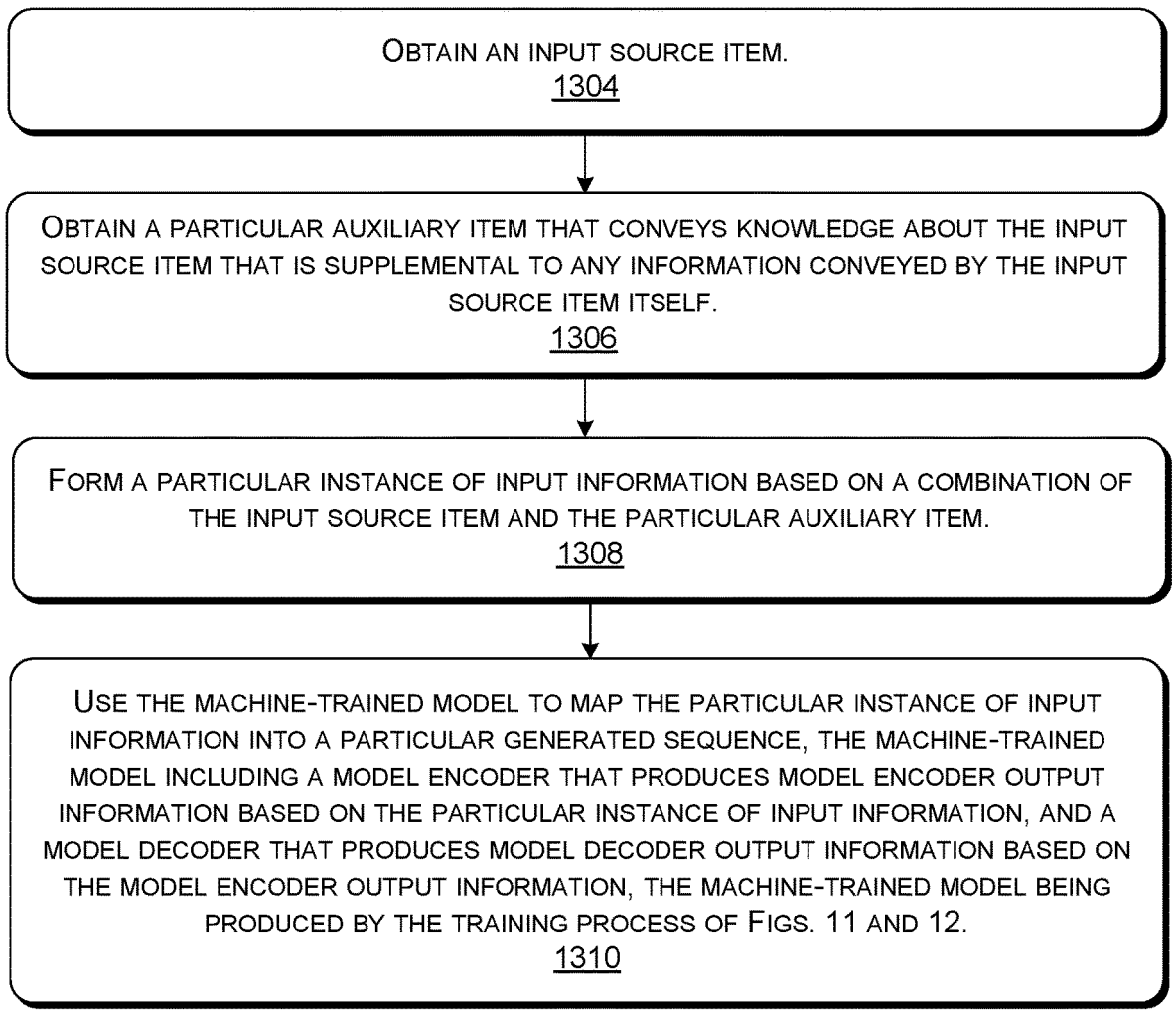
FIG. 13 is a flowchart that shows an overview of one manner of operation of the inference-stage system of FIG. 7.

FIGS. 11-13 show processes that explain the operation of the training system 102 and the inference-stage system 702 of Section A in flowchart form. Since the principles underlying the operation of the systems (102, 702) have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

FIG. 11 shows a process 1102 that represents an overview of the operation of the training system 102 of FIG. 1. In block 1104, for a particular training example of linguistic information, the training system 102 obtains a source item, a target item, a first auxiliary item, and a second auxiliary item. The first and second auxiliary items convey knowledge about the source item that is supplemental to any information conveyed by the source item itself, and the target item represents a transformed counterpart of the source item. In block 1106, in the first processing path 114, the training system 102: forms the first instance of input information 120 by combining the source item and the first auxiliary item; transforms the first instance of input information 120 into first-path encoder output information 122 using the first-path encoder 116; and transforms the first-path encoder output information 122 into first-path decoder information 124 using the first-path decoder 118. In block 1108, in the second processing path 126, the training system 102: forms the second instance of input information 130 by combing the source item and the target item; and transforms the second instance of input information 130 into second-path encoder output information 132 using the second-path encoder 128. In block 1110, in the third processing path 134, the training system 102: forms the third instance of input information 134 by combining the source item and the second auxiliary item; and transforms the third instance of input information 134 into third-path decoder output information 142 using the third-path encoder 136 and the third-path decoder 140. In block 1112, the training system 102 updates training weights based on loss information generated using the first processing path 114, the second processing path 126, and the third processing path 134. The process 1102 is repeating for additional training examples in a training data set. The machine-trained model 104 that is produced by the process 1102 corresponds to a trained counterpart of the first-path encoder 116 and the first-path decoder 118.

FIG. 12 is a flowchart that provides additional detail regarding one implementation of the updating operation of block 1112 of FIG. 11. In block 1202, the training system 102 generates first loss information based on a comparison of the first-path decoder output information 124 and the target item. In block 1204, the training system 102 generates, based on encoder-level contrastive learning, second loss information based on comparison of the first-path encoder output information 122 and the second-path encoder output information 132. In block 1206, the training system 102 generates, based on decoder-level contrastive learning, third loss information based on a comparison of the first-path decoder output information 124 and the third-path decoder output information 142. In block 1208, the training system 102 updates the machine-trained model 104 based on the first loss information, the second loss information, and the third loss information.

FIG. 13 shows a process 1302 that represents one manner of operation of the inference-stage system 702 of FIG. 7. In block 1304, the inference-stage system 702 obtains the input source item 704. In block 1306, the inference-stage system 702 obtains a particular auxiliary item 708 that conveys knowledge about the input source item 704 that is supplemental to any information conveyed by the input source item 794 itself. In block 1308, the inference-stage system 702 forms a particular instance of input information based on a combination of the input source item 704 and the particular auxiliary item 708. In block 1310, the inference-stage system 702 uses the machine-trained model 104 to map the particular instance of input information into the particular generated sequence 716. The machine-trained model 104 includes the model encoder 712 that produces model encoder output information based on the particular instance of input information, and the model decoder 714 that produces model decoder output information based on the model encoder output information. The machine-trained model 104 is produced by a training process that involves encoder-level contrastive learning and decoder-level contrastive learning. The encoder-level contrastive learning involves comparing the model encoder output information with other encoder output information (e.g., 132) that is produced by another encoder (e.g., the second-path encoder 128). The decoder-level contrastive learning involves comparing the model decoder output information with other decoder output information (e.g., 142) that is produced by another decoder (e.g., the third-path decoder 140).

C. Representative Computing Functionality

Figure 14:
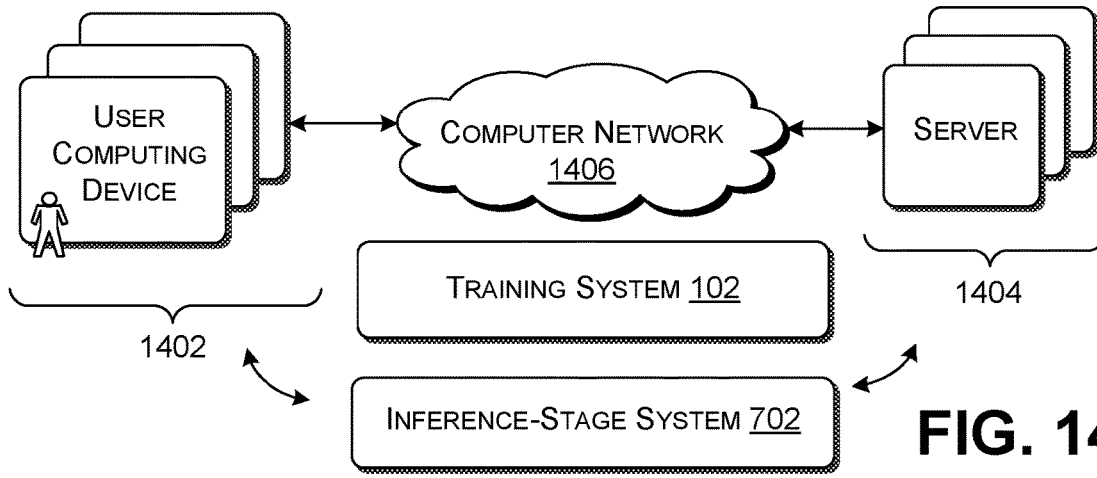
FIG. 14 shows computing equipment that can be used to implement the training system of FIG. 1 and the inference-stage system of FIG. 7

FIG. 14 shows computing equipment that can be used to implement the training system 102 of FIG. 1 and the inference-stage system 702 of FIG. 7. The computing equipment includes a set of user computing devices 1402 coupled to a set of servers 1404 via a computer network 1406. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1406 can be implemented as a local area network, a wide area network (e.g., the Internet), one or more point-to-point links, or any combination thereof.

Figure 15:
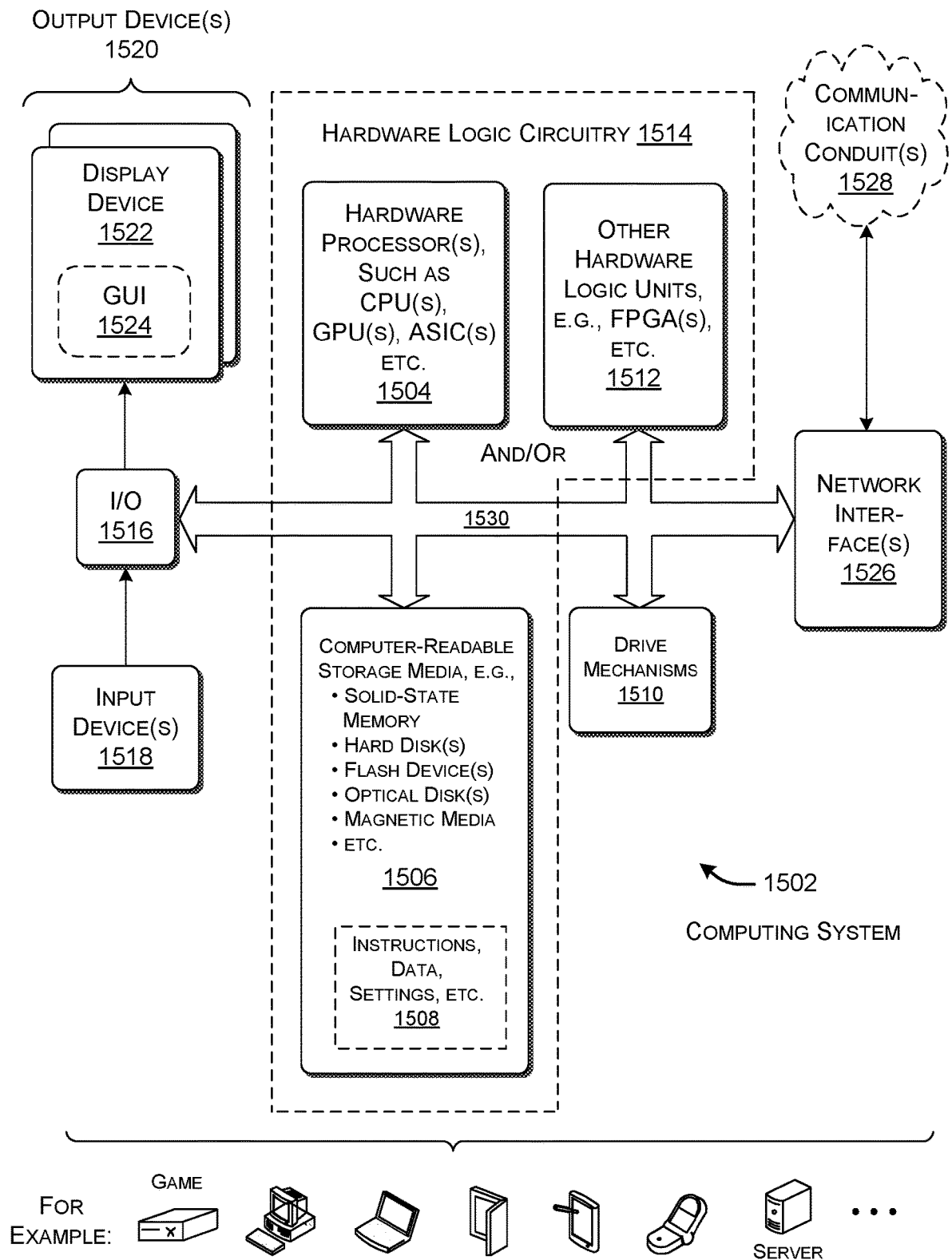
FIG. 15 shows an illustrative type of computing system that can be used to implement any aspect of the features shown in the foregoing drawings.

FIG. 14 also indicates that the training system 102 and the inference-stage system 702 can be spread across the user computing devices 1402 and/or the servers 1404 in any manner. For instance, in some cases, the inference-stage system 702 is entirely implemented by one or more of the servers 1404. Each user may interact with the servers 1404 via a browser application or other programmatic interface provided by a user computing device. In other cases, the inference-stage system 702 is entirely implemented by a user computing device in local fashion, in which case no interaction with the servers 1404 is necessary. In other cases, the functionality associated with the inference-stage system 702 is distributed between the servers 1404 and each user computing device in any manner FIG. 15 shows a computing system 1502 that can be used to implement any aspect of the mechanisms set forth in the above-described figures. For instance, the type of computing system 1502 shown in FIG. 15 can be used to implement any user computing device or any server shown in FIG. 14. In all cases, the computing system 1502 represents a physical and tangible processing mechanism.

The computing system 1502 can include one or more hardware processors 1504. The hardware processor(s) 1504 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1502 can also include computer-readable storage media 1506, corresponding to one or more computer-readable media hardware units. The computer-readable storage media 1506 retains any kind of information 1508, such as machine-readable instructions, settings, data, etc. Without limitation, the computer-readable storage media 1506 may include one or more solid-state devices, one or more magnetic hard disks, one or more optical disks, magnetic tape, and so on. Any instance of the computer-readable storage media 1506 can use any technology for storing and retrieving information. Further, any instance of the computer-readable storage media 1506 may represent a fixed or removable unit of the computing system 1502. Further, any instance of the computer-readable storage media 1506 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1502 can utilize any instance of the computer-readable storage media 1506 in different ways. For example, any instance of the computer-readable storage media 1506 may represent a hardware memory unit (such as Random Access Memory (RAM)) for storing transient information during execution of a program by the computing system 1502, and/or a hardware storage unit (such as a hard disk) for retaining/archiving information on a more permanent basis. In the latter case, the computing system 1502 also includes one or more drive mechanisms 1510 (such as a hard drive mechanism) for storing and retrieving information from an instance of the computer-readable storage media 1506.

The computing system 1502 may perform any of the functions described above when the hardware processor(s) 1504 carry out computer-readable instructions stored in any instance of the computer-readable storage media 1506. For instance, the computing system 1502 may carry out computer-readable instructions to perform each block of the processes described in Section B.

Alternatively, or in addition, the computing system 1502 may rely on one or more other hardware logic units 1512 to perform operations using a task-specific collection of logic gates. For instance, the hardware logic unit(s) 1512 may include a fixed configuration of hardware logic gates, e.g., that are created and set at the time of manufacture, and thereafter unalterable. Alternatively, or in addition, the other hardware logic unit(s) 1512 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 15 generally indicates that hardware logic circuitry 1514 includes any combination of the hardware processor(s) 1504, the computer-readable storage media 1506, and/or the other hardware logic unit(s) 1512. That is, the computing system 1502 can employ any combination of the hardware processor(s) 1504 that execute machine-readable instructions provided in the computer-readable storage media 1506, and/or one or more other hardware logic unit(s) 1512 that perform operations using a fixed and/or programmable collection of hardware logic gates. More generally stated, the hardware logic circuitry 1514 corresponds to one or more hardware logic units of any type(s) that perform operations based on logic stored in and/or otherwise embodied in the hardware logic unit(s). Further, in some contexts, each of the terms "component," "module," "engine," "system," "mechanism," and "tool" refers to a part of the hardware logic circuitry 1514 that performs a particular function or combination of functions.

In some cases (e.g., in the case in which the computing system 1502 represents a user computing device), the computing system 1502 also includes an input/output interface 1516 for receiving various inputs (via input devices 1518), and for providing various outputs (via output devices 1520). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1522 and an associated graphical user interface presentation (GUI) 1524. The display device 1522 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1502 can also include one or more network interfaces 1526 for exchanging data with other devices via one or more communication conduits 1528. One or more communication buses 1530 communicatively couple the above-described units together.

The communication conduit(s) 1528 can be implemented in any manner, e.g., by a local area computer network, a wide area computer network (e.g., the Internet), point-to-point connections, etc., or any combination thereof. The communication conduit(s) 1528 can include any combination of hardwired links, wireless links, routers, gateway functionality, name servers, etc., governed by any protocol or combination of protocols.

FIG. 15 shows the computing system 1502 as being composed of a discrete collection of separate units. In some cases, the collection of units corresponds to discrete hardware units provided in a computing device chassis having any form factor. FIG. 15 shows illustrative form factors in its bottom portion. In other cases, the computing system 1502 can include a hardware logic unit that integrates the functions of two or more of the units shown in FIG. 1. For instance, the computing system 1502 can include a system on a chip (SoC or SOC), corresponding to an integrated circuit that combines the functions of two or more of the units shown in FIG. 15.

The following summary provides a non-exhaustive set of illustrative examples of the technology set forth herein.

(A1) Some implementations of the technology described herein include a method (e.g., the process 1102 of FIG. 11), using a computing system (e.g., the computing system 1502), for producing a machine-trained model (e.g., the machine-trained model 104). For a particular training example of linguistic information, the method involves obtaining (e.g., in block 1104) a source item, a target item, a first auxiliary item, and a second auxiliary item. The first and second auxiliary items convey knowledge about the source item that is supplemental to any information conveyed by the source item itself, and the target item represents a transformed counterpart of the source item. In a first processing path (e.g., the first processing path 114), the method involves (e.g., in block 1106): forming a first instance of input information (e.g., 120) by combining the source item and the first auxiliary item; transforming the first instance of input information into first-path encoder output information (e.g., 122) using a first-path encoder (e.g., the first-path encoder 116); and transforming the first-path encoder output information into first-path decoder information (e.g., 124) using a first-path decoder (e.g., the first-path decoder 118). In a second processing path (e.g., the second processing path 126), the method involves (e.g., in block 1108): forming a second instance of input information (e.g., 130) by combing the source item and the target item; and transforming the second instance of input information into second-path encoder output information (e.g., 132) using a second-path encoder (e.g., the second-path encoder 128). In a third processing path (e.g., the third processing path 134), the method involves (e.g., in block 1110): forming a third instance of input information (e.g., 138) by combining the source item and the second auxiliary item; and transforming the third instance of input information into third-path decoder output information (e.g., 142) using a third-path encoder (e.g., the third-path encoder 136) and a third-path decoder (e.g., the third-path decoder 140). The method then involves (e.g., in block 1112) updating training weights based on loss information generated using the first processing path, the second processing path, and the third processing path. The method is repeated for additional training examples in a training data set. The machine-trained model that is produced by the method corresponds to a trained counterpart of the first-path encoder and the first-path decoder.

The method described above produces a machine-trained model that exhibits high accuracy relative to some competing models. The model achieves high accuracy, in part, based on the method's incorporation of auxiliary information in the training process. At the same time, the model produced by the training system makes efficient use of computer resources and exhibits good latency-related performance. These factors enable developers to use the model in resource-constrained computing platforms, and in applications that demand low-latency responses (such applications that demand real-time responses to user inputs).

(A2) According some implementations of the method of A1, the method further comprises: generating an initial set of training examples; and filtering the initial set of training examples to eliminate one or more initial training examples that fail to satisfy a prescribed quality metric, to produce the training examples in the training data set.

(A3) According to some implementations of the method of A2, the operation of filtering further includes: using a machine-trained classification model to generate a score for a particular initial training example, the particular initial training example including a candidate source item and a candidate auxiliary item, the score identifying how closely the candidate source item matches the candidate auxiliary item; determining that the score fails to satisfy the prescribed quality metric; and eliminating the particular initial training example in response to the determining operation.

(A4) According to some implementations of any of the methods of A1-A3, the operation of updating includes: generating first loss information based on a comparison of the first-path decoder output information and the target item; generating, based on encoder-level contrastive learning, second loss information based on comparison of the first-path encoder output information and the second-path encoder output information; generating, based on decoder-level contrastive learning, third loss information based on a comparison of the first-path decoder output information and the third-path decoder output information; and updating the machine-trained model based on the first loss information, the second loss information, and the third loss information. The use of multi-level contrastive learning further improves the accuracy of the machine-trained model, and accommodates the production of a resource-efficient machine-trained model.

(A5) According to some implementations of the method of A4, the encoder-level contrastive learning generates the second loss information based on a plurality of encoder output information pairs that have been stored in buffer memory, the method updating the buffer memory on a first-in-first-out basis upon receiving a new batch of training examples.

(A6) According to some implementations of the method of A4, the decoder-level contrastive learning generates the third loss information based on a plurality of decoder output information pairs that have been stored in buffer memory, the method updating the buffer memory on a first-in-first-out basis upon receiving a new batch of training examples.

(A7) According to some implementations of the method of A4, the method further includes: updating training weights in the first processing path using back-propagation based on the first loss information, the second loss information, and third loss information after processing a batch of training examples; determining updates to training weights to be applied to the second processing path and the third processing path as a function of the training weights that have been updated in the first processing path; and updating the training weights in the second processing path and the third process path based on the determining operation.

(A8) According to some implementations of any of the methods A1-A7, the first-path encoder, the second-path encoder, and the third-path encoder are each transformer-based neural network encoders. Further, the first-path decoder and the third-path decoder are each transformer-based neural network decoders.

(A9) According to some implementations of any of the methods of A1-A8, the first-path decoder successively generates tokens in the first-path decoder output information using auto-regression. Further, the third-path decoder successively generates tokens in the third-path decoder output information using auto-regression.

(A10) According to some implementations of any of the methods of A1-A9, the method further includes, in an inference-stage system: obtaining an input source item; obtaining a particular auxiliary item that conveys knowledge about the input source item that is supplemental to any information conveyed by the input source item itself; forming a particular instance of input information based on a combination of the input source item and the particular auxiliary item; and using the machine-trained model to map the particular instance of input information into a particular generated sequence.

(A11) According to some implementations of the method of A10, the input source item includes a set of terms that describe respective concepts, and wherein the particular generated sequence includes a sentence that relates to the concepts.

(A12) According to some implementations of the method of A10, the input source item includes a query submitted by a user, and wherein the particular generated sequence includes a set of key terms that relate to the query.

(B1) Some aspects of the technology described herein describe a method (e.g., the method 1302 of FIG. 13) for using a computing system (e.g., the computing system 1502 of FIG. 15) to apply a machine-trained model (e.g., the machine-trained model 104). The method includes: obtaining (e.g., in block 1304) an input source item (e.g., 704); obtaining (e.g., in block 1306) a particular auxiliary item (e.g., 708) that conveys knowledge about the input source item that is supplemental to any information conveyed by the input source item itself; forming (e.g., in block 1308) a particular instance of input information based on a combination of the input source item and the particular auxiliary item; and using (e.g., in block 1310) the machine-trained model to map the particular instance of input information into a particular generated sequence (e.g., 716). The machine-trained model includes a model encoder (e.g., the model encoder 712) that produces model encoder output information based on the particular instance of input information, and a model decoder (e.g., the model decoder 714) that produces model decoder output information based on the model encoder output information. The machine-trained model is produced by a training process (e.g., the process 1102 of FIG. 11) that involves encoder-level contrastive learning and decoder-level contrastive learning. The encoder-level contrastive learning involves comparing the model encoder output information with other encoder output information (e.g., 132) that is produced by another encoder (e.g., the second-path encoder 128). The decoder-level contrastive learning involves comparing the model decoder output information with other decoder output information (e.g., 142) that is produced by another decoder (e.g., the third-path decoder 140). The use of multi-level contrastive learning improves the accuracy of the machine-trained model, and accommodates the production of a resource-efficient machine-trained model.

(B2) According to some implements of the method of B1, the input source item includes a set of terms that describe respective concepts, and the particular generated sequence includes a sentence that relates to the concepts.

(B3) According to some implementations of the method of B1, the input source item includes a query submitted by a user, and the particular generated sequence includes a set of key terms that relate to the query.

(B4) According to some implementations of any of the methods of B1-B3, the model encoder is a transformer-based neural network encoder, and the model decoder is a transformer-based neural network decoder.

(B5) According to some implementations of any of the methods of B1-B4, the model decoder successively generates tokens in the generated sequence using auto-regression.

(B6) According to some implementations of any of the methods of B1-B5, a particular training example incudes a training-example source item, a training-example target item, a first training-example auxiliary item, and a second training-example auxiliary item. The first and second training-example auxiliary items convey knowledge about the training-example source item that is supplemental to any information conveyed by the training-example source item itself, and the training-example target item represents a transformed counterpart of the target-example source item. The model encoder output information and the model decoder output information are produced, for the particular training example, based a combination of the training-example source item and the first training-example auxiliary item. The other encoder output information is produced, for the particular training example, based a combination of the training-example source item and the training-example target item. The other decoder output information is produced, for the particular training example, based on a combination of the training example source item and the second training-example auxiliary item.

In yet another aspect, some implementations of the technology described herein include a computing system (e.g., computing system 1502). The computing system includes hardware logic circuitry (e.g., the hardware logic circuitry 1514) that is configured to perform any of the methods set forth herein (e.g., any of the methods of A1-A12, or any of the methods of B1-B5).

In yet another aspect, some implementations of the technology described herein include a computer-readable storage medium (e.g., the computer-readable storage medium 1506) for storing computer-readable instructions (e.g., the computer-readable instructions 1508). The computer-readable instructions, when executed by one or more hardware processors (e.g., hardware processors 1504), perform any of the methods described herein (e.g., methods A1-12, or any of the methods of B1-B5).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuity 1514 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for generating a machine-trained model, comprising:
   for a particular training example of linguistic information, obtaining a source item, a target item, a first auxiliary item, and a second auxiliary item,
   the first and second auxiliary items conveying knowledge about the source item that is supplemental to any information conveyed by the source item itself, and the target item representing a transformed counterpart of the source item;
   in a first processing path: forming a first instance of input information by combining the source item and the first auxiliary item; transforming the first instance of input information into first-path encoder output information using a first-path encoder; and transforming the first-path encoder output information into first-path decoder information using a first-path decoder;
   in a second processing path: forming a second instance of input information by combing the source item and the target item; and transforming the second instance of input information into second-path encoder output information using a second-path encoder;
   in a third processing path: forming a third instance of input information by combining the source item and the second auxiliary item; and transforming the third instance of input information into third-path decoder output information using a third-path encoder and a third-path decoder; and
   updating training weights based on loss information generated using the first processing path, the second processing path, and the third processing path,
   the method being repeating for additional training examples in a training data set,
   the machine-trained model that is produced by the method corresponding to a trained counterpart of the first-path encoder and the first-path decoder.

2. The method of claim 1, further comprising:
   generating an initial set of training examples; and
   filtering the initial set of training examples to eliminate one or more initial training examples that fail to satisfy a prescribed quality metric, to produce the training examples in the training data set.

3. The method of claim 2, wherein said filtering comprises:
   using a machine-trained classification model to generate a score for a particular initial training example, the particular initial training example including a candidate source item and a candidate auxiliary item, the score identifying how closely the candidate source item matches the candidate auxiliary item;
   determining that the score fails to satisfy the prescribed quality metric; and
   eliminating the particular initial training example in response to said determining.

4. The method of claim 1, wherein said updating comprises:
   generating first loss information based on a comparison of the first-path decoder output information and the target item;
   generating, based on encoder-level contrastive learning, second loss information based on comparison of the first-path encoder output information and the second-path encoder output information;
   generating, based on decoder-level contrastive learning, third loss information based on a comparison of the first-path decoder output information and the third-path decoder output information; and
   updating the machine-trained model based on the first loss information, the second loss information, and the third loss information.

5. The method of claim 4, wherein the encoder-level contrastive learning generates the second loss information based on a plurality of encoder output information pairs that have been stored in buffer memory, the method updating the buffer memory on a first-in-first-out basis upon receiving a new batch of training examples.

6. The method of claim 4, wherein the decoder-level contrastive learning generates the third loss information based on a plurality of decoder output information pairs that have been stored in buffer memory, the method updating the buffer memory on a first-in-first-out basis upon receiving a new batch of training examples.

7. The method of claim 4, wherein method further includes:
   updating training weights in the first processing path using back-propagation based on the first loss information, the second loss information, and the third loss information after processing a batch of training examples;

determining updates to training weights to be applied to the second processing path and the third processing path as a function of the training weights that have been updated in the first processing path; and updating the training weights in the second processing path and the third process path based on said determining.

8. The method of claim 1, wherein the first-path encoder, the second-path encoder, and the third-path encoder are each transformer-based neural network encoders, and wherein the first-path decoder and the third-path decoder are each transformer-based neural network decoders.

9. The method of claim 1, wherein the first-path decoder successively generates tokens in the first-path decoder output information using auto-regression, and wherein the third-path decoder successively generates tokens in the third-path decoder output information using auto-regression.

10. The method of claim 1, further including, in an inference-stage system:

obtaining an input source item;

obtaining a particular auxiliary item that conveys knowledge about the input source item that is supplemental to any information conveyed by the input source item itself;

forming a particular instance of input information based on a combination of the input source item and the particular auxiliary item; and using the machine-trained model to map the particular instance of input information into a particular generated sequence.

11. The method of claim 10, wherein the input source item includes a set of terms that describe respective concepts, and wherein the particular generated sequence includes a sentence that relates to the concepts.

12. The method of claim 10, wherein the input source item includes a query submitted by a user, and wherein the particular generated sequence includes a set of key terms that relate to the query.

13. A computing system that includes the machine-trained model that is produced by the computer-implemented method of claim 1.

14. A computer-implemented method for generating a machine-trained model that includes a model encoder that produces model encoder output information and a model decoder that produces model decoder output information, comprising:

providing a particular training example that includes a training-example source item, a training-example target item, a first training-example auxiliary item, and a second training-example auxiliary item, the first and second training-example auxiliary items conveying knowledge about the training-example source item that is supplemental to any information conveyed by the training-example source item itself, and the training-example target item representing a transformed counterpart of the target-example source item;

producing the model encoder output information and the model decoder output information, for the particular training example, based on a combination of the training-example source item and the first training-example auxiliary item;

producing other encoder output information using another encoder, for the particular training example, based on a combination of the training-example source item and the training-example target item;

producing other decoder output information using another decoder, for the particular training example, based on a combination of the training-example source item and the second training-example auxiliary item;

comparing the model decoder output information with the training-example target item, to produce a first loss measure:

comparing the model encoder output information produced by the model encoder with said another encoder output information that is produced by said another encoder to produce a third loss measure;

comparing the model decoder output information with said another decoder output information that is produced by said another decoder to produce a third measure of loss; and updating training weights the machine-trained model based on the first loss measure, the second loss measure, and the third loss measure.

15. The method of claim 14, wherein the model encoder is a transformer-based neural network encoder, and wherein the model decoder is a transformer-based neural network decoder.

16. The method of claim 14, wherein the model decoder successively generates tokens in the generated sequence using auto-regression.

17. A computing system that includes the machine-trained model that is produced by the computer-implemented method of claim 14.

18. A computer-readable storage medium for storing computer-readable instructions, the computer-readable instructions, when executed by one or more hardware processors, performing a method that comprises:

for a particular training example of linguistic information, obtaining a source item, a target item, a first auxiliary item, and a second auxiliary item, the first and second auxiliary items conveying knowledge about the source item that is supplemental to any information conveyed by the source item itself, and the target item representing a transformed counterpart of the source item, in a first processing path: forming a first instance of input information by combining the source item and the first auxiliary item; transforming the first instance of input information into first-path encoder output information using a first-path encoder; and transforming the first-path encoder output information into first-path decoder information using a first-path decoder;

in a second processing path: forming a second instance of input information by combing the source item and the target item; and transforming the second instance of input information into second-path encoder output information using a second-path encoder;

in a third processing path: forming a third instance of input information by combining the source item and the second auxiliary item; and transforming the third instance of input information into a third-path decoder output information using a third-path encoder and a third-path decoder;

generating first loss information based on a comparison of the first-path decoder output information and the target item;

generating, using encoder-level contrastive learning, second loss information based on comparison of the first-path encoder output information and the second-path encoder output information;

generating, using decoder-level contrastive learning, third loss information based on a comparison of the first-path decoder output information and the third-path decoder output information; and updating a machine-trained model based on the first loss information, the second loss information, and the third loss information, the method being repeating for additional training examples in a training data set, the machine-trained model that is produced by the method corresponding to a trained counterpart of the first-path encoder and the first-path decoder.

19. The computer-readable storage medium of claim 18, wherein the encoder-level contrastive learning generates the second loss information based on a plurality of encoder output information pairs that have been stored in a first buffer memory, the method updating the first buffer memory on a first-in-first-out basis upon receiving a new batch of training examples, and wherein the decoder-level contrastive learning generates the third loss information based on a plurality of decoder output information pairs that have been stored in second buffer memory, the method updating the second buffer memory on a first-in-first-out basis upon receiving the new batch of training examples.

* * * * *